(12) United States Patent
Kanouni et al.

(10) Patent No.: US 7,595,011 B2
(45) Date of Patent: *Sep. 29, 2009

(54) STABILIZED ELECTROCHROMIC MEDIA

(75) Inventors: Mouhcine Kanouni, New York, NY (US); Simon Lord, Wilmington, DE (US); Nancy Cliff, Ringwood, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 11/171,176

(22) Filed: Jun. 30, 2005

(65) Prior Publication Data

US 2006/0007519 A1 Jan. 12, 2006

Related U.S. Application Data

(60) Provisional application No. 60/587,200, filed on Jul. 12, 2004.

(51) Int. Cl.
C09K 9/02 (2006.01)
F21V 9/08 (2006.01)
G02F 1/07 (2006.01)

(52) U.S. Cl. ............... 252/583; 252/586; 359/241; 359/245

(58) Field of Classification Search ............ 252/583, 252/586; 359/241, 245
See application file for complete search history.

(56) References Cited

U.S. PATENT DOCUMENTS

| | | | | |
|---|---|---|---|---|
| 4,314,933 A | * | 2/1982 | Berner | 523/456 |
| 4,772,103 A | | 9/1988 | Saxe | 359/296 |
| 4,902,108 A | | 2/1990 | Byker | 359/265 |
| 5,096,950 A | | 3/1992 | Galbo et al. | 524/99 |
| 5,204,473 A | | 4/1993 | Winter et al. | 546/188 |
| 5,239,406 A | | 8/1993 | Lynam | 359/275 |
| 5,298,067 A | | 3/1994 | Valet et al. | 106/506 |
| 5,467,217 A | | 11/1995 | Check, III et al. | 359/296 |
| 5,770,114 A | | 6/1998 | Byker et al. | 252/583 |
| 6,045,724 A | | 4/2000 | Varaprasad et al. | 252/583 |
| 6,046,304 A | | 4/2000 | Borzatta et al. | 528/423 |
| 6,143,209 A | | 11/2000 | Lynam | 359/583 |
| 6,157,479 A | | 12/2000 | Heuer et al. | 359/265 |
| 6,178,034 B1 | | 1/2001 | Allemand et al. | 359/265 |
| 6,207,083 B1 | | 3/2001 | Varaprasad et al. | 252/583 |
| 6,327,069 B1 | | 12/2001 | Allemand et al. | 359/265 |
| 6,404,532 B1 | | 6/2002 | Berneth et al. | 359/265 |
| 6,545,793 B2 | | 4/2003 | Berneth et al. | 359/265 |
| 6,614,578 B2 | | 9/2003 | Giri et al. | 359/265 |
| 6,753,844 B2 | | 6/2004 | Machida et al. | 345/107 |
| 6,753,999 B2 | | 6/2004 | Zehner et al. | 359/296 |
| 2002/0002249 A1 | * | 1/2002 | Fukuda | 525/391 |
| 2002/0141032 A1 | | 10/2002 | Guarr et al. | 359/265 |
| 2003/0030883 A1 | | 2/2003 | Giri et al. | 359/265 |

FOREIGN PATENT DOCUMENTS

AU 773104 9/2000

* cited by examiner

*Primary Examiner*—Timothy J. Kugel
(74) *Attorney, Agent, or Firm*—Joseph C. Suhadolnik

(57) ABSTRACT

Disclosed are compositions, which are stabilized against degradation and yellowing during exposure to ultraviolet light by the presence of certain hindered amine additives, a method of stabilizing the compositions by the addition of said additives, to the use of such compositions as media in electroactive devices such as electrochromic and electrophoteric devices, and the electroactive devices comprised of these media.

15 Claims, No Drawings

STABILIZED ELECTROCHROMIC MEDIA

This application claims benefit under 35 USC 119(e) of U.S. provisional application No. 60/587,200, filed Jul. 12, 2004.

The present invention relates to compositions which are stabilized against degradation and yellowing during exposure to ultraviolet light, to the method of stabilizing the compositions, to the use of such compositions as media in electroactive devices such as electrochromic and electrophoretic devices, and the electroactive devices comprised of these media.

BACKGROUND

A major problem which limits the usefulness and useful lifetime of materials exposed to ultraviolet (UV) radiation is degradation associated with such exposure. This degradation results from decomposition and other chemical reactions of the materials initiated by absorption of ultraviolet light. Among the undesired consequences of these chemical reactions can be discoloration of the material. Among the materials that are particularly affected by UV induced discoloration are solvents that comprise the media of functional devices such as electroactive devices, including electrochromic and electrophoretic devices.

Electrochromic devices are well known, e.g., U.S. Pat. Nos. 4,902,108 and 6,178,034. Such devices undergo a change in electromagnetic radiation transmission upon application of an electrical stimulus and have found use in a number of commercial applications. For example, they may be employed in glazings, e.g., energy efficient and privacy windows for architectural or automotive use, automotive rearview mirrors, displays, filters, eyewear, antidazzle and fog penetrating devices, and other applications where variable light transmission is desired. In many of these applications the device is routinely exposed to harmful environmental conditions, including exposure to UV light as from the sun.

Electrochromic devices are typically associated with a noticible change in color. Changes in other optical properties, such as in the degree of clarity and opacity and absorption in the IR, are also characteristics of such devices. The compositions of the present invention can also be employed as part of other electroactive devices associated with similar activity such as liquid crystal and suspended particle devices, including, as examples, electronic paper and privacy windows.

U.S. Pat. Nos. 6,614,578; 5,770,114; 6,207,083 and 6,045,724, which are incorporated herein in their entirety by reference, disclose solvent containing media for electrochromic devices which protect the device by absorbing UV light either through an intrisic property of the solvent or by the addition of UV absorbing additives (UVAs), e.g., benzotriazoles, benzophenones, cyanoacrylates and others.

U.S. Pat. No. 5,148,305 claims compositions with certain cyanoacrylate UVAs in specified electrochromic soultions due to the greater solubility than similar solutions containing certain benzotriazoles, benzophenones, and/or oxanilides.

U.S. Pat. Nos. 6,614,578 and 5,770,114 disclose media for electrochromic devices containing benzotriazole UVAs that are substituted with groups to provide improved solubility.

U.S. Pat. No. 5,239,406, which is incorporated herein in its entirety by reference, discloses a multi-layered electrochromic glazing assembly, at least one layer of which comprises an additive for absorbing, blocking, and/or screening ultraviolet radiation. Said additive may be in one of the polymeric layers of the invention or in the electrochromic medium itself.

U.S. Pat. Nos. 6,143,209; 6,327,069; 6,404,532 and 6,545,793, which are incorporated herein in their entirety by reference, describe electrochromic devices comprising a solvent and optionally UV absorbers including benzophenones, cyanoacrylates, salicylates and benzotriazoles.

Even with the addition of UV absorbing additives, discoloration of the media upon exposure to UV light remains a problem. In addition to UVA's, other stabilizing additives, including hindered amine light stabilizers (HALS), have been used in electrochromic media, for example, U.S. Pat. Nos. 6,178,034 and 5,239,406, and U.S. Pat Appl Pub. 2002/0141032.

Electrophoretic devices are also well known, particularly those comprised of suspended particles, e.g., U.S. Pat. Nos. 4,772,103; 6,753,844 and 6,753,999 which are incorporated herein in their entirety by reference. They can be commercially employed in many of the same applications as electrochromic devises, e.g., glazings and displays and are subject to similar photodegradation. U.S. Pat. No. 5,467,217, incorporated herein in its entirety by reference, discloses electrophoretic light valve compositions stabilized with UV light absorbers.

Several classes of hindered amine light stabilizers (HALS) are known in the art. These classes are differentiated by the substitution at the hindered N-atom, for example, hydrogen, alkyl, acyl, alkoxy, hydroxyalkoxy, acyloxy. Polymeric deirivatives of HALS are also known.

While the use of UVAs and HALS together is well known in the art of UV stabilization, e.g., U.S. Pat. No. 4,314,933, little guidance exists as to which HALS provide the greatest utility in preventing discoloration of the solvent comprising the media of electroactive devices such as electrochromic or electrophoteric devices.

U.S. Pat Appl Pub no. 2002/0141032, specifically mentions the use of a N-alkoxy HALS. U.S. Pat. No. 6,178,034 generically discloses the use of mixtures of additives, including, among others, UVAs and HALS, in the electrolyte layer of an electrochromic device.

We have found that certain HALS, substituted on the hindered nitrogen by hydrogen or alkyl are much more effective than others in preventing the yellowing of solutions containing UVAs found in electroactive devices. The presence os these HALS also extends the usable lifetime of the UVAs.

SUMMARY OF THE INVENTION

The present invention relates to compositions which are suitable as a medium in electroactive devices which comprise
   i) one or more solvents suitable as a medium in an electroactive device,
   ii) an effective amount of one or more additive compounds selected from the group consisting of the ultraviolet light absorbers and
   iii) an effective amount of one or more additive compounds selected from the group consisting of N—H and N-alkyl hindered amine light stabilizers.

The present invention also pertains to a method of preparing a stablized medium useful in electroactive devices, which method comprises the addition of an effective amount of one or more additive compounds selected from the group consisting of N—H and N-alkyl hindered amine light stabilizers to a composition comprising
   i) one or more solvents solvent suitable as a medium in an electroactive device and
   ii) an effective amount of one or more additive compounds selected from the group consisting of the ultraviolet light absorbers.

The present invention also pertains to electroactive devices, such as electrochromic and electrophoretic devices, which comprise the stabilized compositions of the present invention.

DETAILED DISCLOSURE

"Anodic Material"—is meant to refer to a compound or composition capable of undergoing a reversible color change when its valence state is altered due to oxidation.

"Cathodic Material"—is meant to refer to a compound or composition capable of undergoing reversible color change when its valence state is altered due to reduction.

"Electroactive"—is meant to refer to either a compound, mixture of compounds, solution, composition or device capable of undergoing a reversible change of composition or property, for example, color, oxidation state, conductivity, opacity, optical clarity, diffractive index, electromagnetic transmittance, modulus, adhesion, pH, permeability among others when subjected to electrical stimulus." Examples of electroactive devices include electrochromic and electrophoretic devices.

"Electrochromic"—is meant to refer to either a compound, mixture of compounds, solution, composition or device capable of undergoing a reversible change in electromagnetic absorption/transmittance when subjected to electrical stimulus.

"Electrophoretic"—is meant to refer to either a compound, mixture of compounds, particle, suspension, solution, composition or device capable of undergoing a reversible change in the geometric orientation of at least one component when subjected to electrical stimulus. Suspended particle devices are the most pertinent to the present invention as in, for example, the electrophoretic display in U.S. Pat. Appl. 2003/0020844 which is incorporated herein in its entirety by reference.

"Yellowing"—is meant to refer to increase in color of the solution over time. Typically the color formed is in fact yellow, but given the nature of organic degradation reactions, the color formed may also be various shades of yellow and other hues including brown.

Electrochromic devices require a pair of electrodes and at least one compound or material that changes transmittance upon or after application of an electric stimulus.

The electrochromic devices of the present invention typically comprise: (a) a first substantially transparent substrate having an electrically conductive material associated therewith; (b) a second substrate having an electrically conductive material associated therewith; and (c) an electrochromic medium which comprises: (1) at least one solvent; (2) at least one anodic material; (3) at least one cathodic material, wherein either or both of the anodic and cathodic materials are electroactive and at least one of the anodic and cathodic materials is electrochromic; and (4) may also comprise a non-electrochromic, current carrying electrolyte.

Examples can be found in

U.S. Pat. No. 4,902,108, which is incorporated herein in its entirety by reference, describes single-compartment, self-erasing, solution-phase electrochromic device.

U.S. Pat. No. 6,178,034, which is incorporated herein in its entirety by reference, describes a multi-layered electrochromic device useful for large area glazings.

U.S. Pat. Appl. 2002/0241032, which is incorporated herein in its entirety by reference, describes electrochromic media and devices.

U.S. Pat. Nos. 6,143,209; 6,327,069; 6,404,532 and 6,545,793, which are incorporated herein in their entirety by reference, describe electrochromic devices comprising a solvent and UV absorbing additives.

The anodic and cathodic materials may also be combined or linked by a bridging unit as described in U.S. Pat. No. 6,241,916 which is hereby incorporated herein by reference in its entirety. It is also possible to link anodic materials or cathodic materials by similar methods. The concepts described can further be combined to yield a variety of electroactive materials that are linked or coupled, including linking of a redox buffer such as linking of a color-stabilizing moiety to an anodic and/or cathodic material. The anodic and cathodic electrochromic materials can also include coupled materials as described in U.S. Pat. No. 6,249,369 which is hereby incorporated herein by reference in its entirety.

The electrochromic devices can additionally include near infrared (NIR) absorbing compounds as described in U.S. Pat. No. 6,193,912 which is also hereby incorporated herein by reference in its entirety. In addition, electrochromic medium may comprise other materials, such as thermal stabilizers, antioxidants, thickeners, viscosity modifiers, tint providing agents, redox buffers, and mixtures thereof.

Additionally, a single-layer, single-phase medium may include a medium where the anodic and cathodic materials are incorporated into a polymer matrix as is described in U.S. Pat. No. 6,569,361 which is incorporated herein in its entirety by reference. The anodic or cathodic materials may also comprise a conductive polymer with inherent electrochromic activity.

Multi-layer devices are known. The medium may be made up in layers and includes a material attached directly to an electrically conducting electrode or confined in close proximity thereto which remains attached or confined when electrochemically oxidized or reduced.

Multi-phase media are also known. One or more materials in the medium undergoes a change in phase during the operation of the device, for example a material contained in solution in the ionically conducting electrolyte forms a layer on the electrically conducting electrode when electrochemically oxidized or reduced.

For purposes of the present disclosure, the solvent containing component of the electrochromic device need not contain any of the functional elements, electroactive or otherwise, of the electrochromic device. In practice, however, one would expect that as the solvent is useful as media for the electrochromic materials it would contain some functional aspect of the device be it an electrolyte, anodic material(s), cathodic material(s), or any combination thereof, and may comprise other components as well, as understood in the electrochromic device art.

The anodic active, cathodic active, and electrolyte materials, as well as the other materials of the electrochromic devices, and the concentrations used, can be found in the patents cited herein.

Among the solvents suitable for the invention are those known in the art of solution-phase electrochromic devices to be suitable for the dissolution of one or more of an anodic electrochromic compound, a cathodic electrochromic compound, and/or a material functioning as a charge carrying electrolyte in order to provide an electroactive medium of an electrochromic device. For example, at least one of the one or more solvents is selected from the group consisting of sulfones, amides, sulfoxides, ethers, polyethers, alcohols, polyols, nitriles, ketones, aldehydes, carboxylic acids, cyclic esters, cyclic carbonates, glycidyl ether carbonates and silicon/polyol co-polymers.

For example, at least one of the one or more solvents is selected from the group consisting of sulfones, ketones, nitriles and cyclic carbonates.

Such solvents include, among others, commercially available 3-methylsulfolane, tetramethylene sulfone, N,N-dimethylformamide, dimethyl sulfoxide, tetraglyme and other polyethers, alcohols such as methanol, ethanol, ethoxyethanol, nitriles, such as acetonitrile, glutaronitrile, 3-hydroxypropionitrile, methoxypropionitrile, 3-ethoxypropionitrile 2-methylglutaronitrile, cyanoethyl sucrose, ketones including acetone, methyl ethyl ketone, cyclopentanone, cyclohexanone, benzoyl acetone, 4-hydroxy-4-methyl-2-pentanone, acetophenone, carboxylic acids such as acetic acid, cyclic esters including beta-propiolactone, 2-acetylbutyrolactone, gamma-butyrolactone, gamma-valerolactone, 4-ethenyl-1,3-dioxalane-2-one, propylene carbonate (PC), ethylene carbonate, 1,2-butylene carbonate, glycidyl ether carbonates (such as those commercially available from Texaco Chemical Company, Austin, Tex.) silicon/polyol co-polymers, (such as those available from Genesse Polymers, Flint, Mich.), and combinations thereof and homogenous mixtures of the same.

For example, at least one of the one or more solvents is selected from the group consisting of 3-methylsulfolane, tetramethylene sulfone, N,N-dimethylformamide, dimethyl sulfoxide, tetraglyme or other polyether, methanol, ethanol, ethoxyethanol, acetonitrile, glutaronitrile, 3-hydroxypropionitrile, methoxypropionitrile, 3-ethoxypropionitrile 2-methylglutaronitrile, cyanoethyl sucrose, acetone, methyl ethyl ketone, methyl amyl ketone, cyclopentanone, cyclohexanone, benzoyl acetone, 4-hydroxy-4-methyl-2-pentanone, acetophenone, acetic acid, beta-propiolactone, 2-acetylbutyrolactone, gamma-butyrolactone, gamma-valerolactone, 4-ethenyl-1,3-dioxalane-2-one, propylene carbonate, ethylene carbonate and 1,2-butylene carbonate.

For example, at least one of the one or more solvents is selected from the group consisting of 3-methylsulfolane, tetramethylene sulfone, tetraglyme, acetone, methyl ethyl ketone, methyl amyl ketone, cyclopentanone, cyclohexanone, acetonitrile, glutaronitrile, 3-hydroxypropionitrile, methoxypropionitrile, 3-ethoxypropionitrile 2-methylglutaronitrile, 4-ethenyl-1,3-dioxalane-2-one, propylene carbonate, ethylene carbonate and 1,2-butylene carbonate.

For example, at least one of the one or more solvents is selected from the group consisting of tetraglyme, methyl amyl ketone, acetonitrile and propylene carbonate.

More than one solvent may be used.

The media comprising the solvent may also be dispersed within a polymer or co-polymer matrix as described in, for example, U.S. Pat. No. 5,928,572 which is incorporated herein in its entirety by reference. This interspersed layer may exist as a free standing gel.

Monomers with the appropriate polymerization initiators can be used as a monomer composition so that this composition can be in-situ polymerized after the cell has been filled by radiation, heat, or electrogenerated initiators to form a solid. Such processes are described, for example, in U.S. Pat. No. 6,020,987 which is incorporated herein in its entirety by reference.

U.S. Pat. No. 6,020,987, describes an improved electrochromic medium comprising at least three electroactive materials having absorption spectra when activated that add together such that the color of the electrochromic medium can be pre-selected by individually choosing the concentrations of the at least three electroactive materials.

For purposes of the present disclosure, the solvent composition need not contain any of the functional elements, electroactive or otherwise, of the electrochromic device, except for the UV stabilizers. In practice, however, one would expect the solvent to be used as a media for some functional aspect of the device be it an electrolyte, anodic material(s), cathodic material(s), or any combination thereof and may comprise other components as well, as understood in the electrochromic device art, e.g., tinting materials, heat stabilizers, infrared absorbing dyes, moisture scavengers, fillers, viscosity modifiers, etc. If an opaque layer is desired, such as in display applications, then the solution may contain at least one additive selected from the group consisting of inert inorganic oxide fillers, inorganic sulfate fillers, inorganic carbonate fillers, inorganic pigments, organic pigments, surfactants, plasticizers and dispersing agents.

The composition of the present invention is also useful as the suspending fluid in electrophoretic devices, examples of which can be found in U.S. Pat. Nos. 4,247,175; 4,407,565; 4,772,103; 6,753,844 and 6,753,999 and U.S. Pat. Appl. 2003/002084 incorporated herein in their entirety by reference.

Solvents useful in electrophoretic devices include organic solvents, such as halogenated organic solvents, saturated linear or branched hydrocarbons, silicone oils, and low molecular weight halogen-containing polymers are some useful suspending fluids.

Useful organic solvents include, but are not limited to, epoxides, such as, for example, decane epoxide and dodecane epoxide; vinyl ethers, such as, for example, cyclohexyl vinyl ether and Decave® (International Flavors & Fragrances, Inc., New York, N.Y.); aromatic hydrocarbons, such as, for example, toluene and naphthalene. Halogenated organic solvents include, but are not limited to, tetrafluorodibromoethylene, tetrachloroethylene, trifluorochloroethylene, 1,2,4-trichlorobenzene and carbon tetrachloride. Hydrocarbons include, but are not limited to, dodecane, tetradecane, the aliphatic hydrocarbons in the Isopar® series (Exxon, Houston, Tex.), Norpar® (series of normal paraffinic liquids), Shell-Sol® (Shell, Houston, Tex.), and Sol-Trol® (Shell), naphtha, and other petroleum solvents. Silicone oils include, but are not limited to, octamethyl cyclosiloxane and higher molecular weight cyclic siloxanes, poly (methyl phenyl siloxane), hexamethyldisiloxane, and polydimethylsiloxane. Low molecular weight halogen-containing polymers include, but are not limited to, poly(chlorotrifluoroethylene) polymer (Halogenated hydrocarbon Inc., River Edge, N.J.), Galden® (a perfluorinated ether from Ausimont, Morristown, N.J.), or Krytox® from DuPont (Wilmington, Del.).

Aliphatic and aromatic alcohols, esters of aliphatic and aromatic alcohols and acids, and ethers of aliphatic and aromatic alcohols are also useful in such devices.

Alcohols include methanol and 2-ethylhexanol. Esters include alkyl acetates including isopentyl acetate, alkylphenyl acetates including p-nonylphenyl acetate, diesters including dioctylphthalate, diisodecyl adipate, dioctyl sebacate and hindered esters including 3,5,5-trimethylhexyl isobutyrate, 3,5,5-trimethylhexyl neopentanoate, neopentyl neopentanoate and isobutyl neopentanoate. Useful ethers include di-2-ethylhexyl ether, di-3,5,5-trimethylhexyl ether, di-neopentyl ether and non-symmetrical branched ethers.

The electrophoretic suspending fluid may comprise one or more solvents. Other materials common in the art may also be present, such as surfactants, water, polymers, surface modifiers, charge control agents and charge adjuvants. Reactants or solvents for the microencapsulation process (oil soluble monomers, for example) can also be contained in the suspending fluid.

While the liquid suspension can be used as such as the light-modulating element, it is also possible to create a light-modulating film by having droplets of a liquid suspension distributed in a polymer matrix, e.g., U.S. Pat. Nos. 3,257,905; 3,341,274; 4,919,521; 5,463,491 and 5,463,492 which are incorporated herein by reference.

Thus, a film suitable for use in a electrophoretic device may comprise a cross-linked polymer matrix having droplets of a electrophoretic suspension distributed in the matrix. This film may be swollen with a suitable liquid. This improves the frequency response characteristics of the resulting film and reduces light scatter.

U.S. Pat. Nos. 5,467,217 and 4,407,565, incorporated herein in their entirety by reference, describe fluid suspensions for electrophoretic devices stabilized against photodegradation by incorporation of UVAs, specifically benzotriazole and cyanoacrylate UVAs respectfully. No mention is made of other stabilizers such as HALS.

The UVAs chosen for the present compositions must be of sufficient solubility in the chosen solvent to be contained at an effective level. For example, U.S. Pat. Nos. 5,148,305; 6,614,578 and 5,770,114 base their selection of specific UVA compounds based on the solubility of the UVA in the electrochromic media solvent.

The present ultraviolet light absorbers (UVAs) are selected from the group consisting of the hydroxyphenylbenzotriazoles, the benzophenones, the benzoxazones, the α-cyanoacrylates the oxanilides, the tris-aryl-s-triazines, the cinnamates, the malonates, the benzoates, terephthalic and isophthalic acids with resorcinol and phenols, benzilidenes, and the salicylates.

More than one UVA may be selected and used together.

For example, at least one of the one or more ultraviolet light absorbers is selected from the group consisting of hydroxyphenylbenzotriazoles, benzophenones, and tris-aryl-s-triazines.

The present hydroxyphenylbenzotriazole UV absorbers are disclosed for example in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905,4,853,471; 5,268,450; 5,278,314; 5,280,124; 5,319,091; 5,410,071; 5,436,349; 5,516,914; 5,554,760; 5,563,242; 5,574,166; 5,607,987; 5,770,114; 5,977,219; 6,166,218; 6,262,151; 6,392,056; 6,451,887; 6,458,872 and 6,614,578 the disclosure of which are hereby incorporated by reference.

The present tris-aryl-s-triazine UV absorbers are disclosed for example in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, the disclosures of which are hereby incorporated by reference.

The present benzophenone UV absorbers are for example derivatives of 2,4 dihydroxy benzophenone; 2,2',4, trihydroxy benzophenone; and 2,2',4,4,-tetrahydroxybenzophenone as found in the art and the patents cited herein.

The present cyanoacrylate, cinnamate and malonate UV absorbers are for example derivatives of α-cyano-β,β-diphenylacrylic acid; cinnamic acid; α-cyano-β-methylcinnamic acid; and benzylidenemalonates as found in the art and the patents cited herein.

For example, UV absorbers useful in the instant invention are those found in U.S. Pat. Nos. 5,148,305; 6,614,578; 5,770,114; 6,143,209; 6,327,069; 6,545,793 and 6,404,532 which are incorporated in their entirety by reference.

For example, UV absorbers useful in the instant invention are those found in U.S. Pat. Nos. 6,614,578 and 5,770,114 which are incorporated in their entirety by reference.

For example UV absorbers useful in the instant invention are selected from the group consisting of 2-hydroxybenzophenone substituted in the 4-position by hydroxy, $C_1$-$C_{12}$ alkoxy, $C_1$-$C_{12}$ branched alkoxy or said alkoxy or branched alkoxy substituted by one or more hydroxy and/or interupted by one or more oxygen atoms, 2-[2-hydroxy-5-($C_1$-$C_{12}$ alkyl or branched alkyl)phenyl]-2H-benzotriazole, 2-[2-hydroxy-3-($C_1$-$C_{12}$ alkyl or branched alkyl)-5-($C_1$-$C_{12}$ alkyl or branched alkyl)-phenyl]-2H-benzotriazole, 2-[2-hydroxy-3,5-di(α,α-dimethylbenzyl)phenyl]-2H-benzotriazole, 2-[2-hydroxy-3-(α,α-dimethylbenzyl)-5-($C_1$-$C_{12}$ alkyl or branched alkyl)]-2H-benzotriazole, $C_1$-$C_{18}$ alkyl or branched alkyl esters of 3-(benzotriazol-2-yl)-5-tert-butyl-4-hydroxyhydrocinnamic acid, 2-methoxyethyl 3-(benzotriazol-2-yl)-5-tert-butyl-4-hydroxyhydrocinnamate, 2-(2-methoxyethoxy)ethyl 3-(benzotriazol-2-yl)-5-tert-butyl-4-hydroxyhydro cinnamate, 2-[2-(2-methoxyethoxy)ethoxy]ethyl 3-(benzotriazol-2-yl)-5-tert-butyl-4-hydroxy-hydrocinnamate, 2-{2-hydroxy-3-tert-butyl-5-[2-(omega-hydroxy-octa(ethyleneoxy)carbonyl)ethyl]-phenyl}-2H-benzotriazole, 5-chloro-2-[2-hydroxy-5-($C_1$-$C_{12}$ alkyl or branched alkyl) phenyl]-2H-benzotriazole, 5-chloro-2-[2-hydroxy-3-($C_1$-$C_{12}$ alkyl or branched alkyl)-5-($C_1$-$C_{12}$ alkyl or branched alkyl)phenyl]-2H-benzotriazole, 5-chloro-2-[2-hydroxy-3,5-di(α,α-dimethylbenzyl)phenyl]-2H-benzotriazole, 5-chloro-2-[2-hydroxy-3-(α,α-dimethylbenzyl)-5-($C_1$-$C_{12}$ alkyl or branched alkyl)]-2H-benzotriazole, $C_1$-$C_{18}$ alkyl or branched alkyl esters of 3-(5-chloro-benzotriazol-2-yl)-5-tert-butyl-4-hydroxyhydrocinnamic acid, 2-methoxyethyl 3-(5-chloro-benzotriazol-2-yl)-5-tert-butyl-4-hydroxyhydro cinnamate, 2-(2-methoxyethoxy)ethyl 3-(5-chloro-benzotriazol-2-yl)-5-tert-butyl-4-hydroxy hydrocinnamate, 2-[2-(2-methoxyethoxy)ethoxy]ethyl 3-(5-chloro-benzotriazol-2-yl)-5-tert-butyl-4-hydroxyhydrocinnamate, 5-chloro-2-{2-hydroxy-3-tert-butyl-5-[2-(omega-hydroxy-octa(ethyleneoxy)-carbonyl)ethyl]phenyl}-2H-benzotriazole, 5-trifluoro-2-[2-hydroxy-5-($C_1$-$C_{12}$ alkyl or branched alkyl)phenyl]-2H-benzo-triazole, 5-trifluoro-2-[2-hydroxy-3-($C_1$-$C_{12}$ alkyl or branched alkyl)-5-($C_1$-$C_{12}$ alkyl or branched alkyl)phenyl]-2H-benzo-triazole, 5-trifluoro-2-[2-hydroxy-3,5-di(α,α-dimethylbenzyl) phenyl]-2H-benzotriazole, 5-trifluoro-2-[2-hydroxy-3-(α,α-dimethylbenzyl)-5-($C_1$-$C_{12}$ alkyl or branched alkyl)]-2H-benzotriazole, $C_1$-$C_{18}$ alkyl or branched alkyl esters of 3-(5-trifluoro-benzotriazol-2-yl)-5-tert-butyl-4-hydroxyhydrocinnamic acid, 2-methoxyethyl 3-(5-trifluoro-benzotriazol-2-yl)-5-tert-butyl-4-hydroxyhydro-cinnamate, 2-(2-methoxyethoxy)ethyl 3-(5-trifluoro-benzotriazol-2-yl)-5-tert-butyl-4-hydroxy-hydrocinnamate, 2-[2-(2-methoxyethoxy)ethoxy]ethyl 3-(5-trifluoro-benzotriazol-2-yl)-5-tert-butyl-4-hydroxyhydrocinnamate, 5-trifluoro-2-{2-hydroxy-3-tert-butyl-5-[2-(omega-hydroxy-octa(ethyleneoxy)-carbonyl)ethyl]phenyl}-2H-benzotriazole $C_1$-$C_{18}$ alkyl or branched alkyl esters of p-methoxycinnamic acid, $C_1$-$C_{18}$ alkyl or branched alkyl esters of p-methoxybenzylidenemalonic acid, $C_1$-$C_{18}$ alkyl or branched alkyl esters of 2-cyano-3,3-diphenylacrylic acid, di-(1,2,2,6,6-pentamethylpiperidin-4-yl) p-methoxybenzylidenemalonate, 2,4-bis(2,4-dimethylphenyl)-6-(2-hydroxy-4-($C_1$-$C_{12}$ alkyl or branched alkyl)oxy-phenyl)-s-triazine, 2,4-diphenyl-6-(2-hydroxy-4-($C_1$-$C_{12}$ alkyl or branched alkyl)oxyphenyl)-s-triazine, 2,4-bis(2,4-dimethylphenyl)-6-[2-hydroxy-4-(3-do-/tridecyloxy-2-hydroxypropoxy)phenyl]-s-triazine, 2,4-bis(2,4-dimethylphenyl)-6-[2-hydroxy-4-(3-do-/tridecyloxy-2-hydroxypropoxy)-5-α-cumylphenyl]-s-triazine, 2-[2-hydroxy-4-(1-($C_1$-$C_{18}$ alkyl or branched alkyl)oxy-carbonylethoxy)phenyl]-4,6-bis(4-phenylphenyl)-1,3,5-triazine, and the reaction product of 2,4,6-tris(2,4-dihydroxyphenyl)-s-triazine with octyl α-haloacetate.

For example, UV absorbers useful in the instant invention are selected from the group consisting of 4-methoxy-2-hydroxybenzophenone,
4-octyloxy-2-hydroxybenzophenone,
4-dodecyloxy-2-hydroxybenzophenone,
4-(2-ethylhexyloxy)-2-hydroxybenzophenone,
2,4-dihydroxybenzophenone,
4-methoxy-2,2'-dihydroxybenzophenone,
4,4'-dimethoxy-2,2'-dihydroxybenzophenone,
2-(2-hydroxy-5-methylphenyl)-2H-benzotriazole,
2-(2-hydroxy-5-tert-octylphenyl-2H-benzotriazole,
2-(2-hydroxy-3,5-di-tert-amylphenyl)-2H-benzotriazole,
2-(2-hydroxy-3-sec-butyl-5-tert-butylphenyl)-2H-benzotriazole,
2-(2-hydroxy-3-dodecyl-5-methylphenyl)-2H-benzotriazole,
2-[2-hydroxy-3,5-di(α,α-dimethylbenzyl)phenyl]-2H-benzotriazole,
2-[2-hydroxy-3-(α,α-dimethylbenzyl)-5-tert-octylphenyl]-2H-benzotriazole,
octyl 3-(benzotriazol-2-yl)-5-tert-butyl-4-hydroxyhydrocinnamate,
butyl 3-(benzotriazol-2-yl)-5-tert-butyl-4-hydroxyhydrocinnamate,
pentyl 3-(benzotriazol-2-yl)-5-tert-butyl-4-hydroxyhydrocinnamate,
2-methoxyethyl 3-(benzotriazol-2-yl)-5-tert-butyl-4-hydroxyhydrocinnamate,
2-(2-methoxyethoxy)ethyl 3-(benzotriazol-2-yl)-5-tert-butyl-4-hydroxyhydrocinnamate,
2-[2-(2-methoxyethoxy)ethoxy]ethyl 3-(benzotriazol-2-yl)-5-tert-butyl-4-hydroxyhydrocinnamate,
2-{2-hydroxy-3-tert-butyl-5-[2-(omega-hydroxy-octa (ethyleneoxy)carbonyl)ethyl]-phenyl}-2H-benzotriazole,
5-chloro-2-(2-hydroxy-3-tert-butyl-5-methylphenyl)-2H-benzotriazole,
5-chloro-2-(2-hydroxy-3,5-di-tert-butylphenyl)-2H-benzotriazole,
octyl 3-(5-chlorobenzotriazol-2-yl)-5-tert-butyl-4-hydroxyhydrocinnamate,
octyl 3-(5-trifluoromethyl-benzotriazol-2-yl)-5-tert-butyl-4-hydroxyhydrocinnamate,
butyl 3-(5-trifluoromethyl-benzotriazol-2-yl)-5-tert-butyl-4-hydroxyhydrocinnamate,
pentyl 3-(5-trifluoromethyl-benzotriazol-2-yl)-5-tert-butyl-4-hydroxyhydrocinnamate,
5-triflouromethyl-2-{2-hydroxy-3-tert-butyl-5-[2-(omega-hydroxy-octa-(ethyleneoxy)carbonyl)ethyl]phenyl}-2H-benzotriazole,
2-(2-methoxyethoxy)ethyl 3-(5-trifluoromethylbenzotriazol-2-yl)-5-tert-butyl-4-hydroxyhydrocinnamate,
2-[2-(2-methoxyethoxy)ethoxy]ethyl 3-(5-trifluoromethylbenzotriazol-2-yl)-5-tert-butyl-4-hydroxyhydrocinnamate,
2,4-bis(2,4-dimethylphenyl)-6-(2-hydroxy-4-octyloxyphenyl)-s-triazine,
2,4-bis(2,4-dimethylphenyl)-6-[2-hydroxy-4-(3-do-/tridecyloxy-2-hydroxypropoxy)phenyl]-s-triazine,
2-[2-hydroxy-4-(1-octyoxycarbonylethoxy)phenyl]-4,6-bis(4-phenylphenyl)-1,3,5-triazine and the reaction product of 2,4,6-tris(2,4-dihydroxyphenyl)-s-triazine with octyl α-haloacetate.

The hindered amine light stabilizers are disclosed for example in U.S. Pat. Nos. 3,640,928; 3,992,390; 5,204,473; 5,980,783; 6,046,304; 6,297,299; 5,844,026 and 6,271,377, and contain the group of the formula $$E-N\begin{matrix} G_1 & G_2 \\ & \diagdown \\ & \diagup Z_1 \\ & \diagdown \\ & \diagup Z_2 \\ G_1 & G_2 \end{matrix}$$

where $G_1$ and $G_2$ are independently alkyl of 1 to 8 carbon atoms or are together pentamethylene, $Z_1$ and $Z_2$ are each methyl, or $Z_1$ and $Z_2$ together form a linking moiety which may additionally be substituted by an ester, ether, amide, amino, carboxy or urethane group, and E can be, for example, hydrogen, alkyl, acyl, alkoxy, hydroxyalkoxy, acyloxy.

HALS are for example monomeric compounds or are oligomeric or polymeric compounds.

Several classes of hindered amine light stabilizers (HALS) are known in the art which are differentiated by the group E. HALS can be substituted on the N-atom by, for example, hydrogen, alkyl, acyl, alkoxy, hydroxyalkoxy, acyloxy. Polymeric deirivatives of HALS are also known.

The hindered amine light stabilizers of the present invention are selected from the classes where the substituent E is hydrogen, alkyl or substituted alkyl group, including polymers wherein an N-alkyl group is a portion of the repeating unit of the polymer.

Like the UVAs, the HALS chosen for the present compositions must be of suffcient solublity in the chosen solvent to be contained at an effective level. They must also not interfere with th functioning of the device, for example, they must not hinder the color change of an electrochromic device.

More than one HALS may be selected and used together.

The present sterically hindered amine stabilizers are for example of the formula A-R
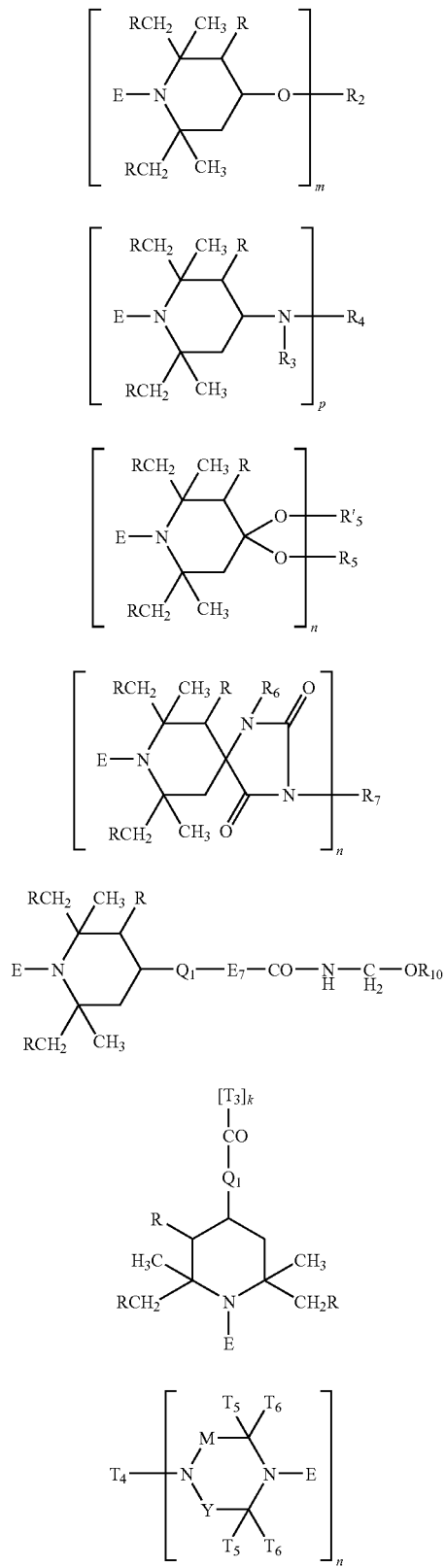
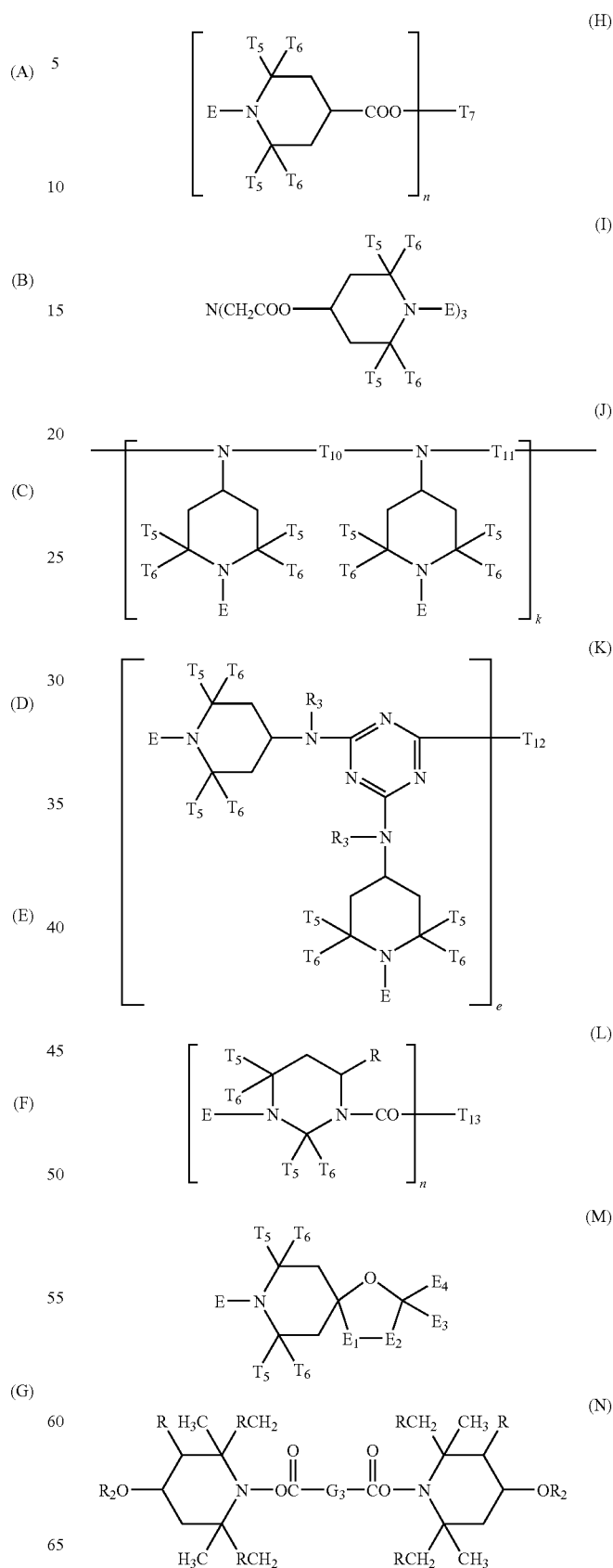

-continued

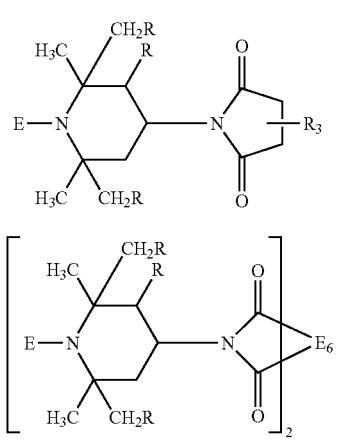

(O)

(P)

wherein

E is hydrogen, $C_1$-$C_{18}$ alkyl, $C_3$-$C_8$ alkenyl, $C_3$-$C_8$ alkynyl, $C_7$-$C_{12}$ aralkyl, glycidyl or a group —$CH_2$ $CH(OH)$-Z, in which Z is hydrogen, methyl, ethyl or phenyl, R is hydrogen or methyl, m is 1 to 4, when m is 1, $R_2$ is hydrogen, $C_1$-$C_{18}$alkyl or said alkyl optionally interrupted by one or more oxygen atoms, $C_2$-$C_{12}$alkenyl, $C_6$-$C_{10}$aryl, $C_7$-$C_{18}$aralkyl, glycidyl, a monovalent acyl radical of an aliphatic, cycloaliphatic or aromatic carboxylic acid, or a carbamic acid, for example an acyl radical of an aliphatic carboxylic acid having 2-18 C atoms, of a cyclo-aliphatic carboxylic acid having 5-12 C atoms or of an aromatic carboxylic acid having 7-15 C atoms, or

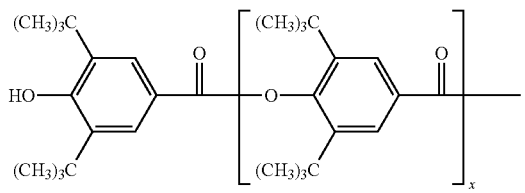

wherein x is 0 or 1,

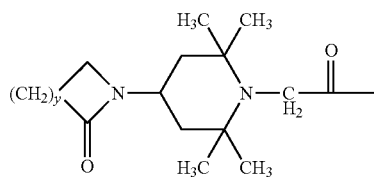

wherein y is 2-4;

when m is 2, $R_2$ is $C_1$-$C_{12}$alkylene, $C_4$-$C_{12}$alkenylene, xylylene, a divalent acyl radical of an aliphatic, cycloaliphatic, aralphatic or aromatic dicarboxylic acid or of a dicarbamic acid, for example an acyl radical of an aliphatic dicarboxylic acid having 2-18 C atoms, of a cycloaliphatic or aromatic dicarboxylic acid having 8-14 C atoms, or of an aliphatic, cycloaliphatic or aromatic dicarbamic acid having 8-14 C atoms;

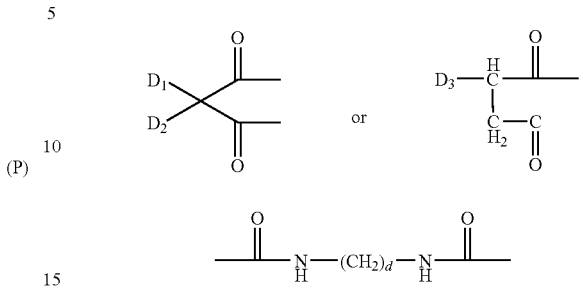

wherein $D_1$ and $D_2$ are independently hydrogen, an alkyl radical containing up to 8 carbon atoms, an aryl or aralkyl radical including 3,5-di-t-butyl-4-hydroxybenzyl radical, $D_3$ is hydrogen, or an alkyl or alkenyl radical containing up to 18 carbon atoms, and d is 0-20;

when m is 3, $R_2$ is a trivalent acyl radical of an aliphatic, unsaturated aliphatic, cycloaliphatic, or aromatic tricarboxylic acid;

when m is 4, $R_2$ is a tetravalent acyl radical of a saturated or unsaturated aliphatic or aromatic tetracarboxylic acid including 1,2,3,4-butanetetracarboxylic acid, 1,2,3,4-but-2-enetetracarboxylic, and 1,2,3,5- and 1,2,4,5-pentanetetracarboxylic acid;

p is 1, 2 or 3, $R_3$ is hydrogen, $C_1$-$C_{12}$alkyl, $C_5$-$C_7$cycloalkyl, $C_7$-$C_9$aralkyl, $C_2$-$C_{18}$alkanoyl, $C_3$-$C_5$alkenoyl or benzoyl;

when p is 1, $R_4$ is hydrogen, $C_1$-$C_{18}$alkyl, $C_5$-$C_7$cycloalkyl, $C_2$-$C_8$alkenyl, unsubstituted or substituted by a cyano, carbonyl or carbamide group, aryl, aralkyl, or it is glycidyl, a group of the formula —$CH_2$—$CH(OH)$-Z or of the formula —CO-Z or —CONH-Z wherein Z is hydrogen, methyl or phenyl; or a group of the formulae

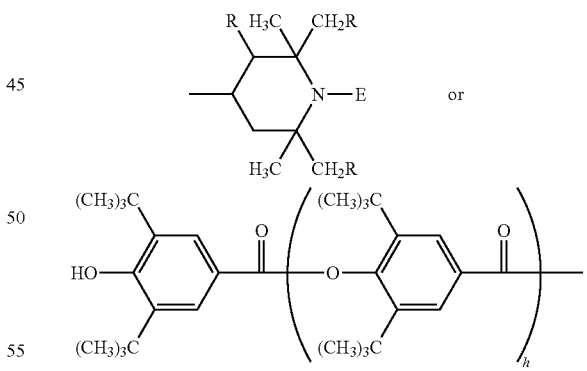

where h is 0 or 1, $R_3$ and $R_4$ together, when p is 1, can be alkylene of 4 to 6 carbon atoms or 2-oxo-polyalkylene the cyclic acyl radical of an aliphatic or aromatic 1,2- or 1,3-dicarboxylic acid, when p is 2, $R_4$ is a direct bond or is $C_1$-$C_{12}$alkylene, $C_6$-$C_{12}$arylene, xylylene, a —$CH_2CH(OH)$—$CH_2$ group or a group —$CH_2$—$CH(OH)$—$CH_2$—O—X—O—$CH_2$—$CH(OH)$—$CH_2$— wherein X is $C_2$-$C_{10}$-alkylene, $C_6$-$C_{15}$arylene or $C_6$-$C_{12}$cycloalkylene; or, provided that $R_3$ is not alkanoyl, alkenoyl or benzoyl, $R_4$ can also be a divalent acyl radical of an aliphatic, cycloaliphatic or aromatic dicarboxylic acid or dicarbamic acid, or can be the group —CO—; or $R_4$ is

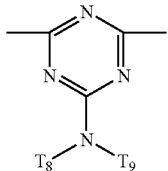

where $T_8$ and $T_9$ are independently hydrogen, alkyl of 1 to 18 carbon atoms, or $T_8$ and $T_9$ together are alkylene of 4 to 6 carbon atoms or 3-oxapentamethylene, for instance $T_8$ and $T_9$ together are 3-oxapentamethylene;

when p is 3, $R_4$ is 2,4,6-triazinyl, n is 1 or 2, when n is 1, $R_5$ and $R'_5$ are independently $C_1$-$C_{12}$ alkyl, $C_2$-$C_{12}$ alkenyl, $C_7$-$C_{12}$ aralkyl, or $R_5$ is also hydrogen, or $R_5$ and $R'_5$ together are $C_2$-$C_8$ alkylene or hydroxyalkylene or $C_4$-$C_{22}$ acyloxyalkylene;

when n is 2, $R_5$ and $R'_5$ together are (—$CH_2$)$_2$C($CH_2$—)$_2$;

$R_6$ is hydrogen, $C_1$-$C_{12}$ alkyl, allyl, benzyl, glycidyl or $C_2$-$C_6$ alkoxyalkyl;

when n is 1, $R_7$ is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula —($CH_2$)$_t$—COO-Q or of the formula —($CH_2$)$_t$—O—CO-Q wherein t is 1 or 2, and Q is $C_1$-$C_4$ alkyl or phenyl; or when n is 2, $R_7$ is $C_2$-$C_{12}$ alkylene, $C_6$-$C_{12}$ arylene, a group —$CH_2CH(OH)$—$CH_2$—O—X—O—$CH_2$—$CH(OH)$—$CH_2$— wherein X is $C_2$-$C_{10}$ alkylene, $C_6$-$C_{15}$ arylene or $C_6$-$C_{12}$ cycloalkylene, or a group —$CH_2CH(OZ')CH_2$—(O$CH_2$—$CH(OZ')CH_2$)$_2$— wherein Z' is hydrogen, $C_1$-$C_{18}$ alkyl, allyl, benzyl, $C_2$-$C_{12}$ alkanoyl or benzoyl;

$Q_1$ is —$N(R_8)$— or —O—; $E_7$ is $C_1$-$C_3$ alkylene, the group —$CH_2$—$CH(R_9)$—O— wherein $R_9$ is hydrogen, methyl or phenyl, the group —($CH_2$)$_3$—NH— or a direct bond;

$R_{10}$ is hydrogen or $C_1$-$C_{18}$ alkyl, $R_8$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group —$CH_2$—$CH(R_9)$—OH wherein $R_9$ has the meaning defined above; a group of the formula

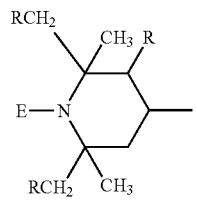

or a group of the formula

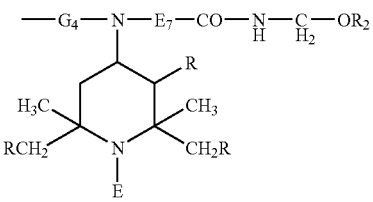

wherein $G_4$ is $C_2$-$C_6$ alkylene or $C_6$-$C_{12}$ arylene; or $R_8$ is a group -$E_7$-CO—NH—$CH_2$—$OR_{10}$;

Formula F denotes a recurring structural unit of a polymer where $T_3$ is ethylene or 1,2-propylene, is the repeating structural unit derived from an alpha-olefin copolymer with an alkyl acrylate or methacrylate; for example a copolymer of ethylene and ethyl acrylate, and where k is 2 to 100;

$T_4$ has the same meaning as $R_4$ when p is 1 or 2, $T_5$ is methyl, $T_6$ is methyl or ethyl, or $T_5$ and $T_6$ together are tetramethylene or pentamethylene, for instance $T_5$ and $T_6$ are each methyl, M and Y are independently methylene or carbonyl, and $T_4$ is ethylene or xylylene where n is 2;

$T_7$ is the same as $R_7$, and $T_7$ is for example octamethylene where n is 2, $T_{10}$ and $T_{11}$ are independently alkylene of 2 to 12 carbon atoms, or $T_{11}$ is

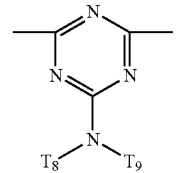

$T_{12}$ is piperazinyl,

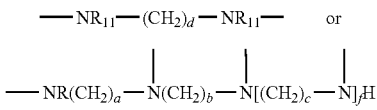

where $R_{11}$ is the same as $R_3$ or is also

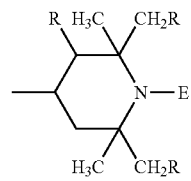

a, b and c are independently 2 or 3, and f is 0 or 1, for instance a and c are each 3, b is 2 and f is 1; and e is 2, 3 or 4, for example 4;

$T_{13}$ is the same as $R_2$ with the proviso that $T_{13}$ cannot be hydrogen when n is 1;

$E_1$ and $E_2$, being different, each are —CO— or —$N(E_5)$— where $E_5$ is hydrogen, $C_1$-$C_{12}$ alkyl or $C_4$-$C_{22}$ alkoxycarbonylalkyl, for instance $E_1$ is —CO— and $E_2$ is —$N(E_5)$—, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by up to four alkyl groups of 1 to 4 carbon atoms, for example methyl, $E_6$ is an aliphatic or aromatic tetravalent radical, $R_2$ of formula (N) is a previously defined when m is 1;

or wherein the hindered amine compound is a compound of the formula I, II, III, IV, V, VI, VII, VIII, IX, X or XI

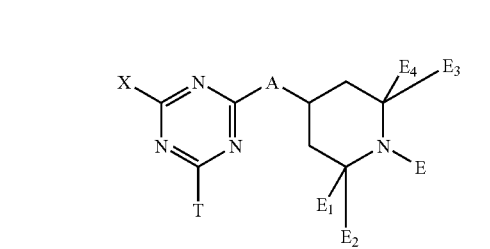
(I)

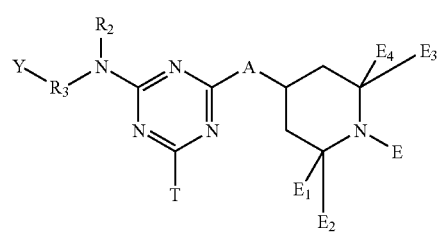
(II)

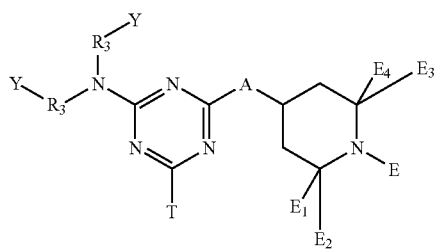
(III)

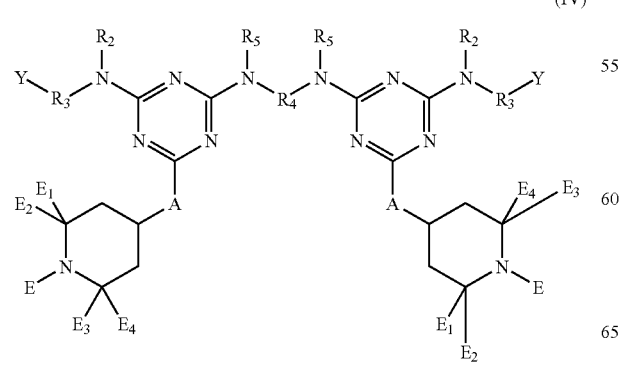
(IV)

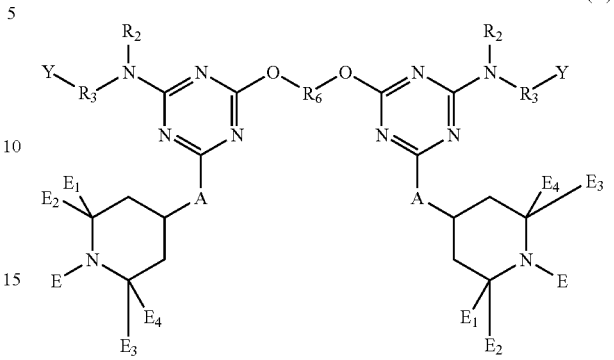
(V)

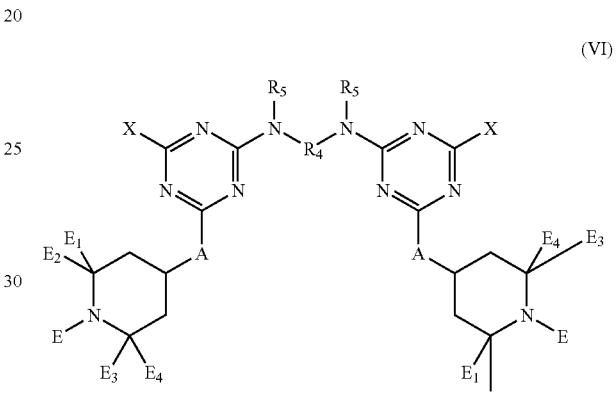
(VI)

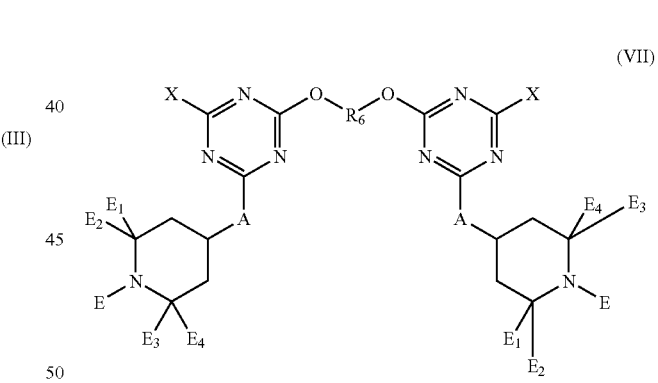
(VII)

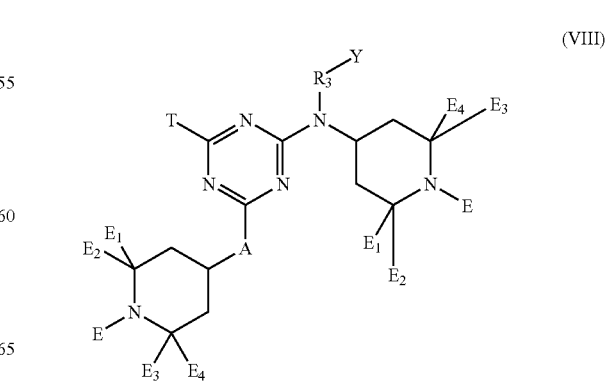
(VIII)

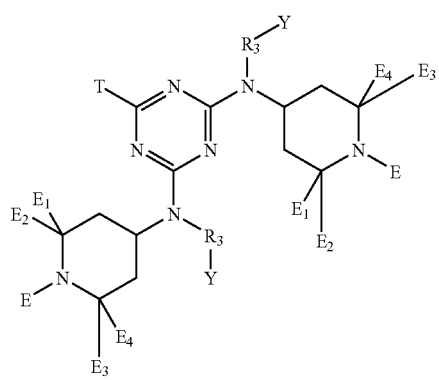
(IX)

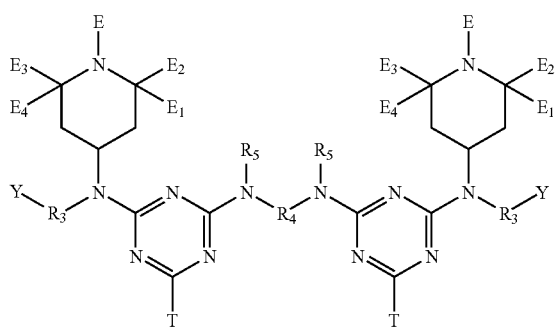
(X)

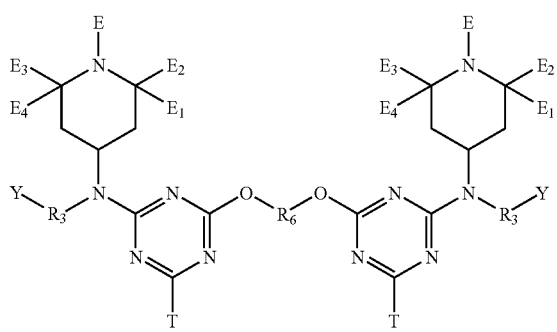
(XI)

wherein

E is hydrogen, $C_1$-$C_{18}$ alkyl, $C_3$-$C_8$ alkenyl, $C_3$-$C_8$ alkynyl, $C_7$-$C_{12}$ aralkyl, glycidyl or a group —$CH_2$ CH(OH)-Z, in which Z is hydrogen, methyl, ethyl or phenyl, $E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene, $R_2$ is hydrogen or a linear or branched chain alkyl of 1 to 12 carbon atoms, $R_3$ is alkylene of 1 to 8 carbon atoms, or $R_3$ is —CO—, —CO—$R_4$-, —CONR$_2$—, or —CO—NR$_2$—$R_4$—, $R_4$ is alkylene of 1 to 8 carbon atoms, $R_5$ is hydrogen, a linear or branched chain alkyl of 1 to 12 carbon atoms, or

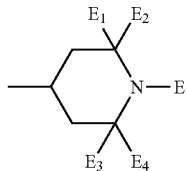

or when $R_4$ is ethylene, two $R_5$ methyl substituents can be linked by a direct bond so that the triazine bridging group —N($R_5$)—$R_4$—N($R_5$)— is a piperazin-1,4-diyl moiety, $R_6$ is alkylene of 2 to 8 carbon atoms or $R_6$ is

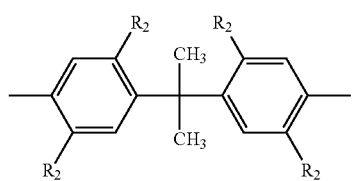

with the proviso that Y is not —OH when $R_6$ is the structure depicted above,

A is —O— or —NR$_7$— where $R_7$ is hydrogen, a straight or branched chain alkyl of 1 to 12 carbon atoms, or $R_7$ is

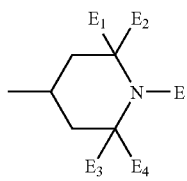

T is phenoxy, phenoxy substituted by one or two alkyl groups of 1 to 4 carbon atoms, alkoxy of 1 to 8 carbon atoms or —N($R_2$)$_2$ with the stipulation that $R_2$ is not hydrogen, or T is

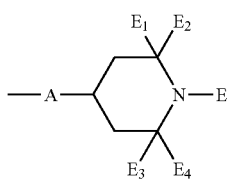

X is —NH$_2$, —NCO, —OH, —O-glycidyl, or —NHNH$_2$, and

Y is —OH, —NH$_2$, —NHR$_2$ where $R_2$ is not hydrogen; or Y is —NCO, —COOH, oxiranyl, —O-glycidyl, or —Si(OR$_2$)$_3$; or the combination $R_3$—Y— is —CH$_2$CH(OH)R$_2$ where $R_2$ is alkyl or said alkyl interrupted by one to four oxygen atoms, or $R_3$—Y— is —CH$_2$OR$_2$;

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Cycloalkyl groups include cyclopentyl and cyclohexyl; typical cycloalkenyl groups include cyclohexenyl; while typical aralkyl groups include benzyl, alpha-methyl-benzyl, alpha, alpha-dimethylbenzyl or phenethyl.

Alkoxy and cycloalkoxy comprise the corresponding alkyl and cycloalkyl groups.

If $R_2$ is a monovalent acyl radical of a carboxylic acid, it is for example an acyl radical of acetic acid, stearic acid, salicyclic acid, benzoic acid or β-(3,5-di-tert-butyl-4-hydroxyphenyl) propionic acid.

If $R_2$ is a divalent acyl radical of a dicarboxylic acid, it is for example an acyl radical of oxalic acid, adipic acid, succinic acid, suberic acid, sebacic acid, phthalic acid dibutylmalonic acid, dibenzylmalonic acid or butyl-(3,5-di-tert-butyl-4-hydroxybenzyl)-malonic acid, or bicycloheptenedicarboxylic acid, with succinates, sebacates, phthalates and isophthalates being specific examples.

If $R_2$ is a divalent acyl radical of a dicarbamic acid, it is for example an acyl radical of hexamethylenedicarbamic acid or of 2,4-toluylenedicarbamic acid.

Hindered amines useful in the present invention include the following the oligomeric compound which is the condensation product of 4,4'-hexa-methylenebis(amino-(2,2,6,6-tetramethylpiperidine)) and 2,4-dichloro-6-[(2,2,6,6-tetra-methylpiperidin-4-yl)butylamino]-s-triazine end-capped with 2-chloro-4,6-bis(dibutyl-amino)-s-triazine,
    4-hydroxy-2,2,6,6-tetramethylpiperidine,
    4-hydroxy-1,2,2,6,6-pentamethylpiperidine,
    1-allyl-4-hydroxy-2,2,6,6-tetramethylpiperidine,
    1-benzyl-4-hydroxy-2,2,6,6-tetramethylpiperidine,
    bis(2,2,6,6-tetramethyl-4-piperidyl) succinate,
    bis(1,2,2,6,6-pentamethyl-4-piperidyl) succinate,
    1,1'-(1,2-ethanediyl)-bis(3,3,5,5-tetramethylpiperazinone),
    bis(1,2,2,6,6-pentamethylpiperidyl)-2-n-butyl-2-(2-hydroxy-3,5-di-tert-butylbenzyl) malonate,
    3-n-octyl-7,7,9,9-tetramethyl-1,3,8-triazaspiro[4.5]decan-2,4-dione,
    the condensate of 2-chloro-4,6-bis(4-n-butylamino-2,2,6,6-tetramethylpiperidyl)-1,3,5-triazine and 1,2-bis(3-aminopropylamino)ethane,
    the condensate of 2-chloro-4,6-di-(4-n-butylamino-1,2,2,6,6-pentamethylpiperidyl)-1,3,5-triazine and 1,2-bis-(3-aminopropylamino)ethane,
    2-undecyl-7,7,9,9-tetramethyl-1-oxa-3,8-diaza-4-oxospiro[4,5]decane,
    the reaction product of 7,7,9,9-tetramethyl-2-cycloundecyl-1-oxa-3,8-diaza-4-oxospiro[4,5]decane and epichlorohydrin,
    bis(2,2,6,6-tetramethylpiperidin-4-yl) sebacate,
    polycondensation product of 2,4-dichloro-6-tert-octylamino-s-triazine and 4,4'-hexamethylenebis(amino-2,2,6,6-tetramethylpiperidine),
    polycondensation product of 1-(2-hydroxyethyl)-2,2,6,6-tetramethyl-4-hydroxy-piperidine and succinic acid,
    polycondensation product of 4,4'-hexamethylenebis-(amino-2,2,6,6-tetramethyl-piperidine) and 1,2-dibromoethane,
    bis(1,2,2,6,6-pentamethylpiperidin-4-yl) sebacate,
    di(1,2,2,6,6-pentamethylpiperidin-4-yl) (3,5-di-tert-butyl-4-hydroxybenzyl)butyl-malonate,
    4-benzoyl-2,2,6,6-tetramethylpiperidine,
    4-stearyloxy-2,2,6,6-tetramethylpiperidine,
    tris(2,2,6,6-tetramethylpiperidin-4-yl) nitrilotriacetate,
    tetrakis(2,2,6,6-tetramethylpiperidin-4-yl) 1,2,3,4-butanetetracarboxylate,
    tetrakis(1,2,2,6,6-pentamethylpiperidin-4-yl) 1,2,3,4-butanetetracarboxylate,
    polycondensation product of 2,4-dichloro-6-morpholino-s-triazine and 4,4'-hexamethylenebis(amino-2,2,6,6-tetramethylpiperidine),
    polycondensation product of 2,4-dichloro-6-morpholino-s-triazine and 4,4'-hexa-methylenebis(amino-(1-methyl-2,2,6,6-tetramethylpiperidine)),
    N,N',N'',N'''-tetrakis[(4,6-bis(butyl-1,2,2,6,6-pentamethylpiperidin-4-yl)-amino-s-triazin-2-yl]-1,10-diamino-4,7-diazadecane,
    octamethylene bis(2,2,6,6-tetramethylpiperidin-4-carboxylate),
    N-2,2,6,6-tetramethylpiperidin-4-yl-n-dodecylsuccinimide,
    N-1,2,2,6,6-pentamethylpiperidin-4-yl-n-dodecylsuccinimide,
    4-$C_{15}$-$C_{17}$alkanoyloxy-2,2,6,6-tetramethylpiperidine,
    polycondensation product of 2,4-dichloro-6-cyclohexylamino-s-triazine and 4,4'-hexamethylenebis(amino-2,2,6,6-tetramethylpiperidine),
    1,5-bis(2,2,6,6-tetramethylpiperidin-4-yl)-1,5-diaza-4-oxopropane,
    copolymer of methyl methracrylate, ethyl acrylate and 2,2,6,6-tetramethylpiperidin-4-yl acrylate,
    copolymer of N-octadecylmaleimide, styrene and N-(2,2,6,6-tetramethylpiperidin-4yl)maleimide,
    1,3,5-tris[3-(2,2,6,6-tetramethylpiperidin-4-ylamino)-2-hydroxy-propyl) isocyanurate,
    olefin copolymer containing units derived from N-[2-(2,2,6,6-tetramethylpiperidin-4-yl)oxalamid-1-yl]maleimide,
    2,2,4,4-tetramethyl-7-oxa-3,20-diaza-21-oxo-dispiro[5,1,11,2]heneicosane,
    $C_{12}$-$C_{14}$alkyl 3-(2,2,4,4-tetramethyl-7-oxa-3,20-diaza-21-oxo-dispiro[5,1,11,2]-heneicosane-20-yl)propionate,
    reaction product of epichlorohydrin and 2,2,4,4-tetramethyl-7-oxa-3,20-diaza-21-oxo-dispiro[5,1,11,2]heneicosane,
    1,3-di(2,2,6,6-tetramethylpiperidin-4-yl) 2,4-ditridecyl butanetetracarboxylate,
    1,3-di(1,2,2,6,6-pentamethylpiperidin-4-yl) 2,4-ditridecyl butanetetracarboxylate,
    polycondensation product of 3,9-bis(1,1-dimethyl-2-hydroxyethyl)-2,4,8,10-tetra-oxaspiro[5.5]undecane, tetramethyl 1,2,3,4-butanetetra-carboxylate and 2,2,6,6-tetramethyl-4-hydroxypiperidine,
    polycondensation product of 3,9-bis(1,1-dimethyl-2-hydroxyethyl)-2,4,8,10-tetra-oxaspiro[5.5]undecane, tetramethyl 1,2,3,4-butanetetra-carboxylate and 1,2,2,6,6-pentamethyl-4-hydroxypiperidine,
    1,4-bis(2,2,6,6-tetramethylpiperidin-4-yl)-2,2-dimethyl-1,4-diaza-4-oxopropane,
    di-(1,2,2,6,6-pentamethylpiperidin-4-yl) p-methoxybenzylidenemalonate,
    reaction product of 4-amino-2,2,6,6-tetramethylpiperidine and tetramethylol-acetylenediurea,
    copolymer of N-(2,2,6,6-tetramethylpiperdin-4-yl)maleimide and a $C_{20}$-$C_{24}$-alpha-olefin,
    poly[3-(2,2,6,6-tetramethylpiperidin-4-yloxy)propyl-methyl-siloxane],
    polycondensation product of 2,4-dichloro-6-[N-butyl-N-(2,2,6,6-tetramethyl-piperidin-4-yl)amino]-s-triazine and 1,10-diamino-4,7-diazadecane,
    dodecyl 3-(2,2,4,4-tetramethyl-7-oxa-3,20-diaza-21-oxo-dispiro[5,1,11,2]henei-cosane-20-yl)propionate,

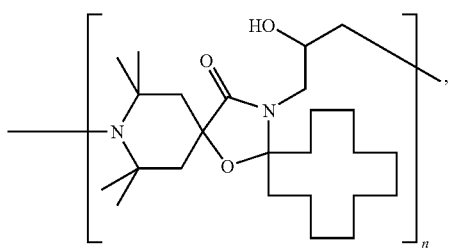

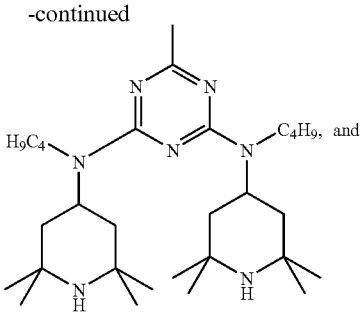

where R' = R" or H and where R" =

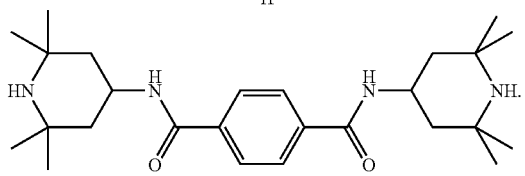

The present oligomeric hindered amines and "polycondesation" product hindered amines have molecular weights greater than about 1000 g/mole. Certain non-oligomeric hindered amines also have molecular weights greater than about 1000 g/mol.

For example, the present oligomeric and polymeric hindered amines are one or more compounds selected from the group consisting of

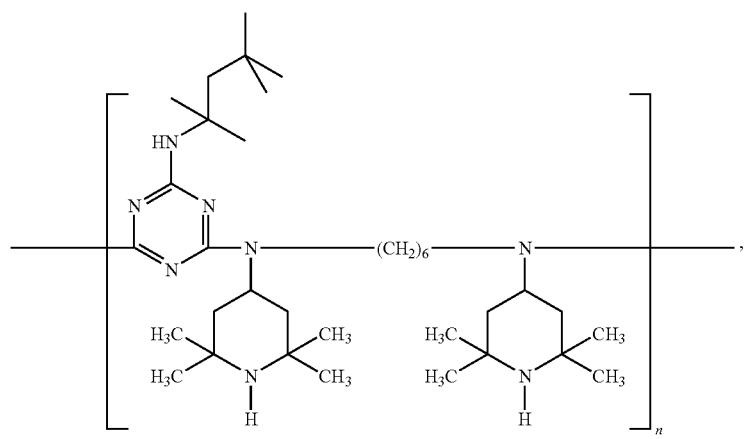

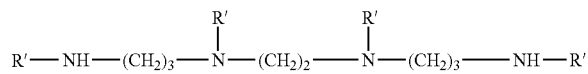

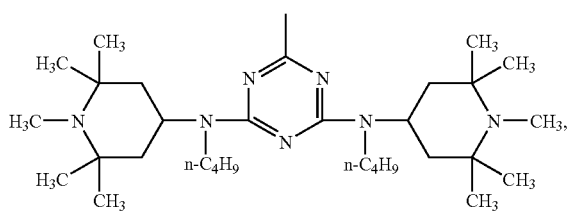

where R' is

-continued
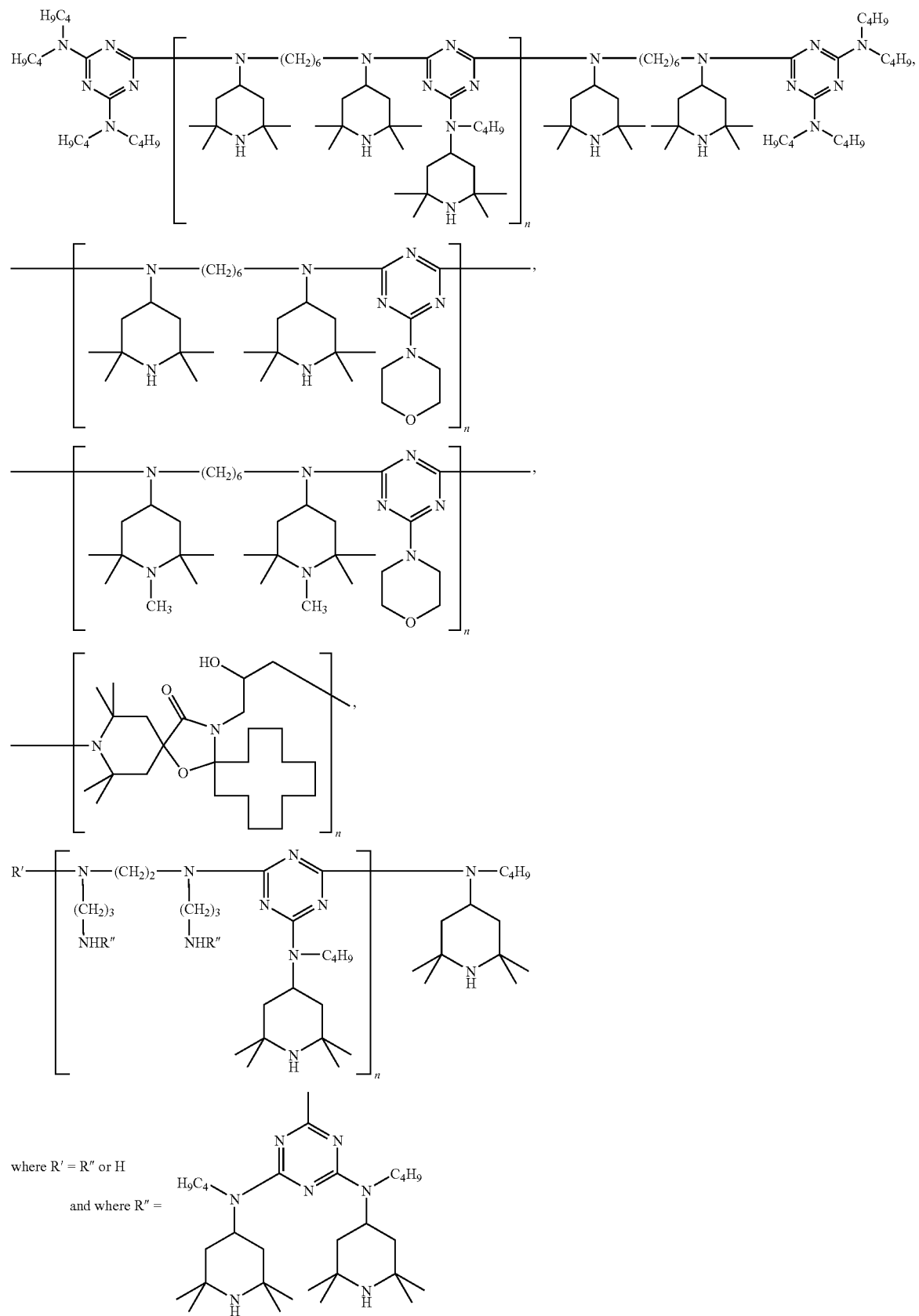

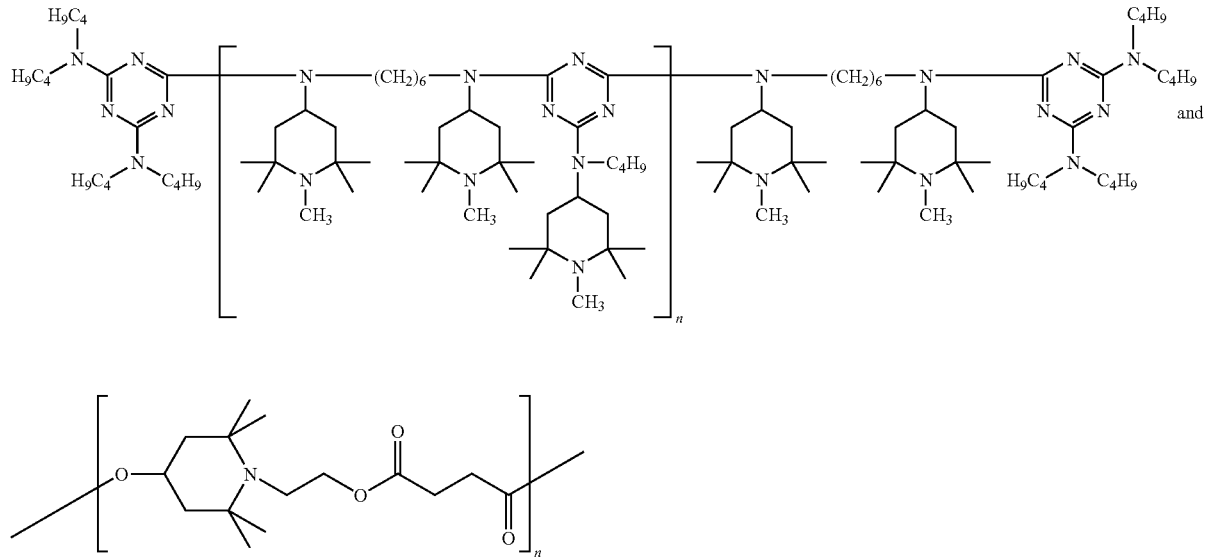

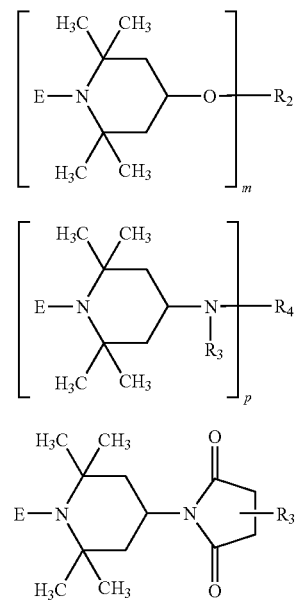

where n is an integer such that the total molecular weight of the oligomeric sterically hindered amine is above about 1000 g/mole.

For example, at least one of the one or more N—H or N-alkyl hindered amine light stabilizers is a compound of formula A', B' or O'

(A')

(B')

(O')

wherein
E is hydrogen, $C_1$-$C_{18}$ alkyl, $C_3$-$C_8$alkenyl, $C_7$-$C_{12}$ aralkyl,
m is 1 to 4,
when m is 1,
$R_2$ is hydrogen, $C_1$-$C_{18}$alkyl or said alkyl optionally interrupted by one or more oxygen atoms, $C_2$-$C_{12}$alkenyl, $C_7$-$C_{18}$aralkyl, glycidyl, a monovalent acyl radical of a $C_2$-$C_{18}$ aliphatic carboxylic acid, said aliphatic monovalent acyl radical of a $C_2$-$C_{18}$ aliphatic carboxylic acid substituted by one or more hydroxy, $C_1$-$C_8$ alkoxy, $C_2$-$C_8$ acyloxy, carbonyl, carboxy or $C_2$-$C_8$ alkoxy carbonyl, a monovalent acyl radical of a $C_5$-$C_{12}$ cyclo-aliphatic carboxylic acid or a monovalent acyl radical of a $C_7$-$C_{15}$ aromatic carboxylic acid, or when m is 2,
$R_2$ is $C_1$-$C_{12}$alkylene, $C_4$-$C_{12}$alkenylene, xylylene, a divalent acyl radical of an aliphatic dicarboxylic acid having 2-18 C atoms, of a cycloaliphatic or aromatic dicarboxylic acid having 8-14 C atoms when m is 3,
$R_2$ is a trivalent acyl radical of a $C_4$-$C_{12}$ aliphatic, $C_5$-$C_{12}$unsaturated aliphatic, $C_6$-$C_{12}$ cycloaliphatic, or $C_9$-$C_{13}$ aromatic tricarboxylic acid;

when m is 4,
$R_2$ is a tetravalent acyl radical of a $C_5$-$C_{12}$ saturated or $C_7$-$C_{12}$ unsaturated aliphatic or $C_9$-$C_{14}$ aromatic tetracarboxylic acid;

p is 1, 2 or 3,
$R_3$ is hydrogen, $C_1$-$C_{12}$alkyl, $C_5$-$C_7$cycloalkyl, $C_7$-$C_9$aralkyl, $C_2$-$C_{18}$alkanoyl, $C_3$-$C_5$alkenoyl or benzoyl;
when p is 1,
$R_4$ is hydrogen, $C_1$-$C_{18}$alkyl, $C_5$-$C_7$cycloalkyl, $C_2$-$C_8$alkenyl, unsubstituted or substituted by a carbonyl or carbamide group, aralkyl, or it is glycidyl, a group of the formula —$CH_2$—CH(OH)-Z or of the formula —CO-Z or —CONH-Z wherein Z is hydrogen, methyl or phenyl; or a group of the formula

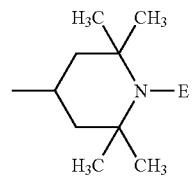

or $R_3$ and $R_4$ together are alkylene of 4 to 6 carbon atoms or 2-oxo-polyalkylene the cyclic acyl radical of an aliphatic or aromatic 1,2- or 1,3-dicarboxylic acid, when p is 2, $R_4$ is $C_1$-$C_{12}$alkylene, $C_6$-$C_{12}$arylene, xylylene, a —$CH_2CH(OH)$—$CH_2$ group or a group —$CH_2$—$CH(OH)$—$CH_2$—O—X—O—$CH_2$—$CH(OH)$—$CH_2$— wherein X is $C_2$-$C_{10}$alkylene, $C_6$-$C_{15}$arylene or $C_6$-$C_{12}$cycloalkylene, a divalent acyl radical of an aliphatic, cycloaliphatic or aromatic dicarboxylic acid or dicarbamic acid, the group —CO—; or $R_4$ is

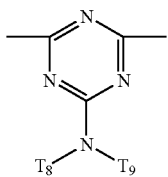

where $T_8$ and $T_9$ are independently hydrogen, alkyl of 1 to 18 carbon atoms, or $T_8$ and $T_9$ together are alkylene of 4 to 6 carbon atoms or 3-oxapentamethylene;

when p is 3, $R_4$ is 2,4,6-triazinyl.

For example, the present hindered amines are one or more compounds selected from the group consisting of the oligomeric compound which is the condensation product of 4,4'-hexa-methylenebis(amino-(2,2,6,6-tetramethylpiperidine)) and 2,4-dichloro-6-[(2,2,6,6-tetra-methylpiperidin-4-yl)butylamino]-s-triazine end-capped with 2-chloro-4,6-bis(dibutyl-amino)-s-triazine.

the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, the reaction product of 7,7,9,9-tetramethyl-2-cycloundecyl-1-oxa-3,8-diaza-4-oxospiro[4,5]decane and epichlorohydrin, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxy-piperidine and succinic acid, polycondensation product of 4,4'-hexamethylenebis-(amino-2,2,6,6-tetramethylpiperidine) and 1,2-dibromoethane, polycondensation product of 2,4-dichloro-6-morpholino-s-triazine and 4,4'-hexa-methylenebis(amino-2,2,6,6-tetramethylpiperidine), polycondensation product of 2,4-dichloro-6-morpholino-s-triazine and 4,4'-hexa-methylenebis(amino-(1-methyl-2,2,6,6-tetramethylpiperidine)), polycondensation product of 2,4-dichloro-6-cyclohexylamino-s-triazine and 4,4'-hexamethylenebis(amino-2,2,6,6-tetramethylpiperidine), polycondensation product of 3,9-bis(1,1-dimethyl-2-hydroxyethyl)-2,4,8,10-tetra-oxaspiro[5.5]undecane, tetramethyl 1,2,3,4-butanetetra-carboxylate and 2,2,6,6-tetra-methyl-4-hydroxypiperidine, polycondensation product of 3,9-bis(1,1-dimethyl-2-hydroxyethyl)-2,4,8,10-tetra-oxaspiro[5.5]undecane, tetramethyl 1,2,3,4-butanetetra-carboxylate and 1,2,2,6,6-pentamethyl-4-hydroxypiperidine, reaction product of 4-amino-2,2,6,6-tetramethylpiperidine and tetramethylol-acetylenediurea, copolymer of N-(2,2,6,6-tetramethylpiperdin-4-yl)maleimide and a $C_{20}$-$C_{24}$-alpha-olefin and, polycondensation product of 2,4-dichloro-6-[N-butyl-N-(2,2,6,6-tetramethyl-piperidin-4-yl)amino]-s-triazine and 1,10-diamino-4,7-diazadecane, For example, the present oligomeric and polymeric hindered amines are one or more compounds selected from the group consisting of

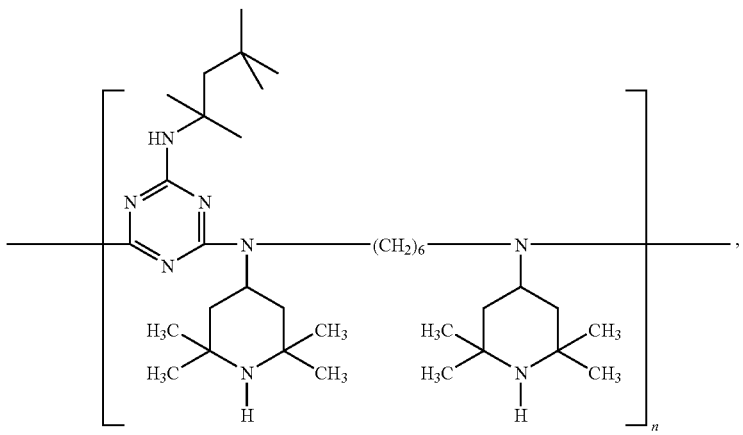

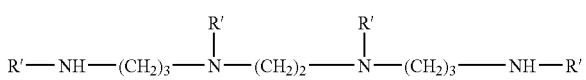

-continued
where R' is 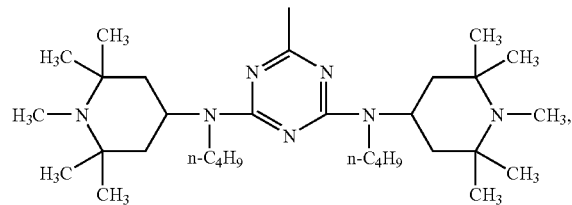
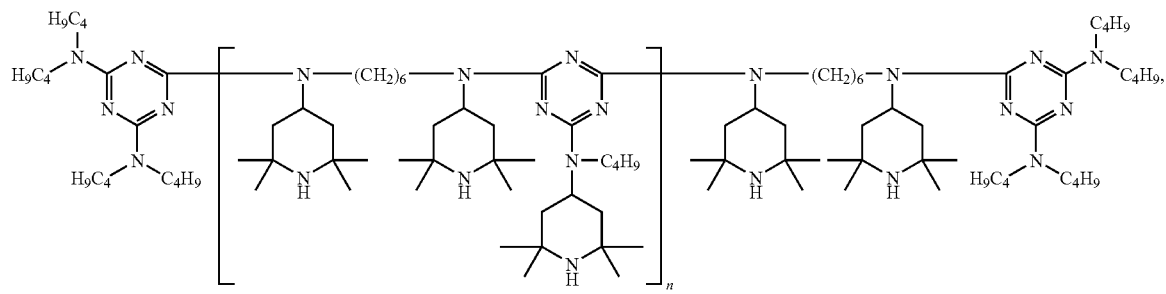
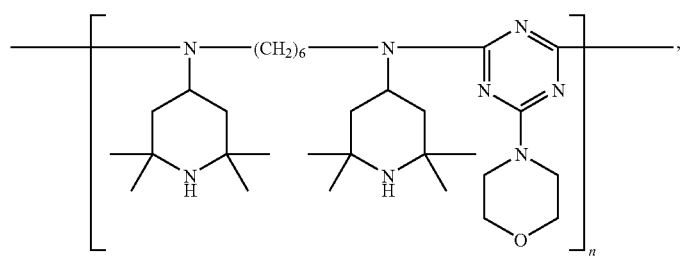
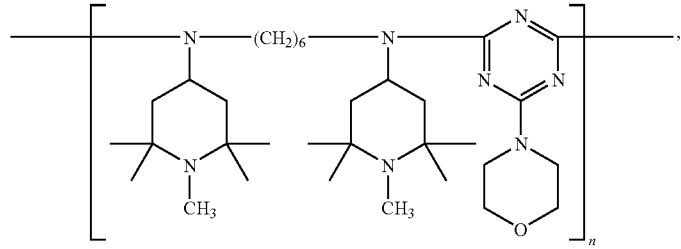
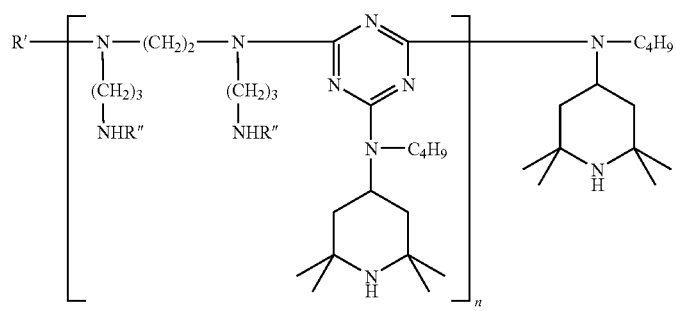
where R' = R'' or H
and where R'' = 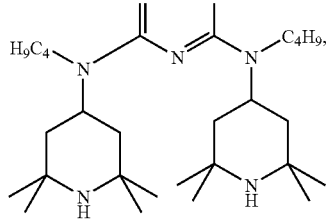

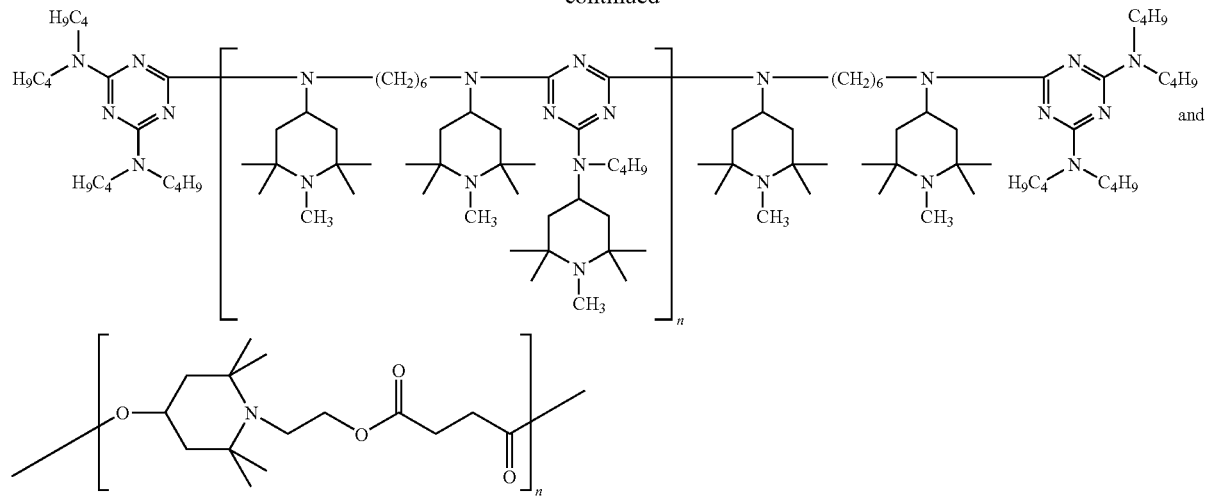

where n is an integer such that the total molecular weight of the oligomeric sterically hindered amine is above about 1000 g/mole.

For example, present hindered amines are one or more compounds selected from the group consisting of
4-hydroxy-2,2,6,6-tetramethylpiperidine,
4-hydroxy-1,2,2,6,6-pentamethylpiperidine,
1-allyl-4-hydroxy-2,2,6,6-tetramethylpiperidine,
1-benzyl-4-hydroxy-2,2,6,6-tetramethylpiperidine,
2,2,6,6-tetramethyl-4-piperidyl or 1,2,2,6,6-pentamethyl-4-piperidyl esters of C2-C24 carboxylic acids or said carboxylic acids substituted by one or more hydroxy, C1-C8 alkoxy, C2-C8 acyloxy, carbonyl, carboxy or C2-C8 alkoxy carbonyl;
2,2,6,6-tetramethyl-4-piperidyl or 1,2,2,6,6-pentamethyl-4-piperidyl bis esters of C2-C10 di-carboxylic acids,
1,1'-(1,2-ethanediyl)-bis(3,3,5,5-tetramethylpiperazinone),
bis(1,2,2,6,6-pentamethylpiperidyl)-2-n-butyl-2-(2-hydroxy-3,5-di-tert-butylbenzyl) malonate,
3-n-octyl-7,7,9,9-tetramethyl-1,3,8-triazaspiro[4.5]decan-2,4-dione,
2-undecyl-7,7,9,9-tetramethyl-1-oxa-3,8-diaza-4-oxospiro[4,5]decane,
the reaction product of 7,7,9,9-tetramethyl-2-cycloundecyl-1-oxa-3,8-diaza-4-oxospiro[4,5]decane and epichlorohydrin,
4-benzoyl-2,2,6,6-tetramethylpiperidine,
tetrakis(2,2,6,6-tetramethylpiperidin-4-yl) 1,2,3,4-butanetetracarboxylate,
tetrakis(1,2,2,6,6-pentamethylpiperidin-4-yl) 1,2,3,4-butanetetracarboxylate,
N,N',N'',N'''-tetrakis[(4,6-bis(butyl-1,2,2,6,6-pentamethylpiperidin-4-yl)-amino-s-triazin-2-yl]-1,10-diamino-4,7-diazadecane,
octamethylene bis(2,2,6,6-tetramethylpiperidin-4-carboxylate),
N-2,2,6,6-tetramethylpiperidin-4-yl-n-dodecylsuccinimide,
N-1,2,2,6,6-pentamethylpiperidin-4-yl-n-dodecylsuccinimide,
1,5-bis(2,2,6,6-tetramethylpiperidin-4-yl)-1,5-diaza-4-oxopropane,
1,3,5-tris[3-(2,2,6,6-tetramethylpiperidin-4-ylamino)-2-hydroxy-propyl) isocyanurate,
2,2,4,4-tetramethyl-7-oxa-3,20-diaza-21-oxo-dispiro[5,1,11,2]heneicosane,
$C_{12}$-$C_{14}$alkyl 3-(2,2,4,4-tetramethyl-7-oxa-3,20-diaza-21-oxo-dispiro[5,1,11,2]-heneicosane-20-yl)propionate,
1,3-di(2,2,6,6-tetramethylpiperidin-4-yl) 2,4-ditridecyl butanetetracarboxylate,
1,3-di(1,2,2,6,6-pentamethylpiperidin-4-yl) 2,4-ditridecyl butanetetracarboxylate,
1,4-bis(2,2,6,6-tetramethylpiperidin-4-yl)-2,2-dimethyl-1,4-diaza-4-oxopropane,
di-(1,2,2,6,6-pentamethylpiperidin-4-yl) p-methoxybenzylidenemalonate,
dodecyl 3-(2,2,4,4-tetramethyl-7-oxa-3,20-diaza-21-oxo-dispiro[5,1,11,2]heneicosane-20-yl)propionate,
di-(1,2,2,6,6-pentamethylpiperidin-4-yl) p-methoxybenzylidenemalonate
the polycondensation product of 2,4-dichloro-6-tert-octylamino-s-triazine and 4,4'-hexamethylenebis(amino-2,2,6,6-tetramethylpiperidine),
the polycondensation product of dimethyl succinate and 4-hydroxy-2,2,6,6-tetramethyl-1-piperidine ethanol, and
the polycondensation product of 2,4-dichloro-6-[N-butyl-N-(2,2,6,6-tetramethyl-piperidin-4-yl)amino]-s-triazine and 1,10-diamino-4,7-diazadecane,
polymeric HALS and oligomeric HALS.

For example, the present hindered amines are one or more compounds selected from the group consisting of
4-hydroxy-2,2,6,6-tetramethylpiperidine,
4-hydroxy-1,2,2,6,6-pentamethylpiperidine,
bis(2,2,6,6-tetramethylpiperidin-4-yl) sebacate,
bis(1,2,2,6,6-pentamethylpiperidin-4-yl) sebacate,
bis(2,2,6,6-tetramethylpiperidin-4-yl) succinate,
bis(1,2,2,6,6-pentamethylpiperidin-4-yl) succinate and
4-stearyloxy-2,2,6,6-tetramethylpiperidine.

For example, least one of the one or more N—H or N-alkyl hindered amine light stabilizers is a N-methyl HALS.

For example, at least one of the one or more N—H or N-alkyl hindered amine light stabilizers is selected from the group consisting of oligomeric and polymeric HALS.

The UVAs and hindered amine stabilizers of this invention, in total, are present for example from about 0.05% to about 30% by weight, based on the weight of the solvent, for example from about 0.1% to about 15%, or from about 0.2% to about 10% by weight, or from about 1% to about 5% by weight.

Acids, such as acetic acid, or acidic portions of the electrolyte or other component may be present which would generate a salt of the hindered amine.

The hindered amine component may be linked as through a covalent bond to a moiety comprising the UVA component.

The term "effective amount" in reference to the additives is that amount that results in the desired effect regarding light stability and yellowing.

EXAMPLES

The following working examples help to illustrate the superior activity of the HALS of the present invention relative to other known classes of HALS in preventing the yellowing of UV stabilized solvent systems useful in electroactive devices.

Solutions are prepared in air using standard conditions, heating is employed when necessary. UV exposures are run in an Atlas 4,000 xenon weatherometer under interior automotive conditions J 1885. Yellowing is determined either by direct observation or via Gardner color measurements. The Gardner color number is defined in DIN ISO 4630, a lower number correlates with less color. The performance of the individual HALS is compared to other HALS and to UVA solutions without HALS. The UVAs are either commercial products or prepared as in the patents referenced HALS 1 is bis(1,2,2,6,6-pentamethylpiperidin-4-yl) sebacate.

HALS 2 is di-(1,2,2,6,6-pentamethylpiperidin-4-yl) p-methoxybenzylidene malonate.

HALS 3 is 4-hydroxy-1-(2-hydroxy-2,2,-dimethyl)ethyl-2,2,6,6-tetramethyl piperidine.

HALS 4 is bis-(1-octyloxy-2,2,6,6-tetramethylpiperidin-4-yl) sebacate.

HALS 5 is 1-acetyl-4-(3-dodecyl-2,5-dioxo-1-pyrrolidinyl)-2,2,6,6-tetramethyl piperidine.

HALS 6 is bis-[1-(2-hydroxy-2,2,-dimethyl)ethyl-2,2,6,6-tetramethylpiperidin-4-yl)]sebacate.

HALS 7 is bis-(2,2,6,6-tetramethylpiperidin-4-yl) sebacate.

Example 1

100 mM solutions of 2-[2-(2-methoxyethoxy)ethoxy]ethyl 3-(benzotriazol-2-yl)-5-tert-butyl-4-hydroxyhydrocinnamate, compound TP3 of U.S. Pat. No. 6,614,578, in propylene carbonate containing 3% by weight based on solvent PMMA are prepared. HALS at various concentrations are added. The resulting solutions are exposed in an Atlas 4,000 xenon weatherometer as described above and the resulting color is measured at the times indicated in the table.

|  | Conc. | Gardner Number | | |
| --- | --- | --- | --- | --- |
| HALS | (mM = milimolar) | 128 hrs | 509 hrs | 1210 hrs |
| No HALS | — | 3.3 | 5.7 | 9.1 |
| HALS 1 | 5 mM | — | — | 1.4 |
| HALS 1 | 30 mM | — | 1.1 | 2.4 |
| HALS 2 | 5 mM | 0.8 | — | — |
| HALS 2 | 30 mM | 1.0 | — | — |
| HALS 3 | 5 mM | — | — | 4.0 |
| HALS 3 | 30 mM | — | — | 2.9 |

|  | Conc. | Gardner Number | | |
| --- | --- | --- | --- | --- |
| HALS | (mM = milimolar) | 128 hrs | 509 hrs | 1210 hrs |
| HALS 6 | 5 mM | — | — | 4.2 |
| HALS 6 | 30 mM | — | — | 3.3 |

HALS of the present invention, even at low levels, prevent yellowing of solution better than N-hydroxyalkoxy HALS.

Example 2

100 mM solutions of 2-(2-methoxyethoxy) ethyl 3-(benzotriazol-2-yl)-5-tert-butyl-4-hydroxyhydrocinnamate, compound TP2 of U.S. Pat. No. 6,614,578, in propylene carbonate containing 3% by weight based on solvent PMMA are prepared. HALS are added and the resulting solutions are exposed in an Atlas 4000 xenon weatherometer as above for 1210 hours and the amount of yellowing is measured.

| HALS | Conc. | Gardner Number |
| --- | --- | --- |
| No HALS | — | 9.1 |
| HALS 1 | 30 mM | 1.9 |
| HALS 6 | 30 mM | 3.4 |

Example 3

100 mM solutions of 2-[2-(2-methoxyethoxy)ethoxy]ethyl 3-(benzotriazol-2-yl)-5-tert-butyl-4-hydroxyhydrocinnamate, compound TP3 of U.S. Pat. No. 6,614,578, in propylene carbonate containing 3% by weight based on solvent PMMA are prepared. HALS at various concentrations are added. The resulting solutions are exposed in an Atlas 4000 xenon weatherometer as above for 252 hours and increase in yellowing visually noted.

| HALS | Conc. | Visible Yellowing |
| --- | --- | --- |
| No HALS | — | severe yellowing |
| HALS 1 | 30 Mm | no yellowing |
| HALS 1 | 100 mM | no yellowing |
| HALS 1 | 5 mM | no yellowing |
| HALS 4 | 5 mM | moderate yellowing |
| HALS 5 | 5 mM | severe yellowing |

HALS of the present invention prevent yellowing of the solution better than N-alkoxy HALS or N-Acyl HALS.

Example 4

5 mM solutions of a high extinction triazine UVA 4,6-diphenyl-2-(4-hexyloxy-2-hydroxyphenyl)-s-triazine in propylene carbonate containing 3% by weight based on solvent PMMA are prepared. Various HALS at various concentrations are added and the resulting solutions are exposed in an Atlas 4,000 xenon weatherometer under interior automotive conditions J 1885 for 252 hours under interior automotive conditions and increase in yellowing visually noted.

| HALS | Conc. | Visible Yellowing |
|---|---|---|
| No HALS | — | severe yellowing |
| HALS 1 | 30 Mm | no yellowing |

Example 5

Solutions of a high extinction triazine UVA 2-[2-hydroxy-4-(1-octyoxycarbonylethoxy)phenyl]4,6-bis(4-phenylphenyl)-1,3,5-triazine in propylene carbonate containing 3% by weight based on solvent PMMA are prepared. HALS 1 is added to one of the solutions. The solutions are exposed in an Atlas 4,000 xenon weatherometer as above for 509 hours and yellowing is measured.

| HALS | Conc. | Gardner Number |
|---|---|---|
| No HALS | — | 3.1 |
| HALS 1 | 5 mM | 0.6 |

Example 6

100 mM solutions of 2-(2-methoxyethoxy)ethyl 3-(5-trifluoromethylbenzotriazol-2-yl)-5-tert-butyl-4-hydroxyhydrocinnamate (UVA A) and 100 mM solutions of 2-[2-(2-methoxyethoxy)ethoxy]ethyl 3-(5-trifluoromethylbenzotriazol-2-yl)-5-tert-butyl-4-hydroxyhydrocinnamate (UVA B), from U.S. Pat. No. 6,6166,218, in propylene carbonate containing 3% by weight based on solvent PMMA are prepared. HALS 1 is added at 5 mM and 30 mM concentrations. The resulting solutions are exposed in an Atlas 4,000 xenon weatherometer as above for 509 hours and the yellowing is measured.

| UVA | HALS 1 Conc. | Gardner Number |
|---|---|---|
| A | — | 4.7 |
| A | 5 mM | 2.7 |
| A | 30 mM | 2.9 |
| B | — | 5.0 |
| B | 5 mM | 2.9 |
| B | 30 mM | 3.3 |

Example 7

Solutions of octyl 3-(benzotriazol-2-yl)-5-tert-butyl-4-hydroxyhydrocinnamate in propylene carbonate are prepared, 3.8 weight % UVA based on total weight of solvent. HALS 1 or HALS 7 are added at 0.2 and 0.4 weight % HALS based on total weight of solvent. The resulting solutions are exposed in an Atlas 4,000 xenon weatherometer as above and the resulting color measured at the total irradiance indicated.

| | | Gardner Number | | | |
|---|---|---|---|---|---|
| HALS | Conc. | 128 hrs | 256 hrs | 512 hrs | 640 hrs |
| No HALS | — | 1.3 | 3.0 | 4.5 | 5.1 |
| HALS 1 | 0.2% | 0.6 | 0.7 | 0.6 | 0.6 |
| HALS 1 | 0.4% | 0.6 | 0.6 | 0.6 | 0.6 |
| HALS 7 | 0.2% | 0.7 | 0.9 | 0.9 | 0.9 |
| HALS 7 | 0.4% | 0.8 | 1.0 | 1.1 | 1.1 |

Example 8

100 mM Solutions of either octyl 3-(benzotriazol-2-yl)-5-tert-butyl-4-hydroxy-hydrocinnamate (UVA C), 2-ethylhexyl 2-cyano-3,3-diphenylacrylatedimethyl (UVA D) or p-methoxybenzylidenemalonate (UVA E) in propylene carbonate, are exposed with and without HALS 1 (5 mM) are exposed in an Atlas 4,000 xenon weatherometer as above and the resulting color measured at the times indicated.

| | Gardner Value @ 256 hr | | Gardner Value @ 512 hr | |
|---|---|---|---|---|
| UVA | No HALS | with HALS | No HALS | with HALS |
| C | 5.3 | 1.1 | 6.9 | 1.1 |
| D | 0.2 | 0.4 | 0.4 | 0.3 |
| E | 0.0 | 0.1 | 0.0 | 0.1 |

Example 9

100 mM Solutions of either octyl 3-(benzotriazol-2-yl)-5-tert-butyl-4-hydroxy-hydrocinnamate (UVA C), or 2-hydroxy-4-octyloxybenzophenone (UVA F) in propylene carbonate are exposed with and without HALS 1 (5 mM) are exposed in an Atlas 4,000 xenon weatherometer as above for 256 hours and the resulting color measured.

| | Gardner Value | |
|---|---|---|
| UVA | No HALS | with HALS |
| C | 4.0 | 3.7 |
| F | 2.1 | 1.2 |

Example 10

100 mM Solutions of octyl 3-(benzotriazol-2-yl)-5-tert-butyl-4-hydroxyhydrocinnamate in various solnvents are exposed with and without HALS 1 (5 mM) are exposed in an Atlas 4,000 xenon weatherometer as above and the resulting color measured at the times indicated.

| | | Gardner Number | | |
|---|---|---|---|---|
| Solvent | HALS | 264 hrs | 528 hrs | 792 hrs |
| Propylene carbonate | no HALS | 4.0 | 5.3 | 6.2 |
| Propylene carbonate | with HALS 1 | 2.1 | 1.9 | 1.9 |
| Acetonitrile | no HALS | 4.6 | 6.1 | 7.4 |

-continued

| Solvent | HALS | Gardner Number | | |
|---|---|---|---|---|
| | | 264 hrs | 528 hrs | 792 hrs |
| Acetonitrile | with HALS 1 | 5.5 | 2.1 | 2.4 |
| Methyl amyl ketone | no HALS | 1.1 | 1.5 | 2.0 |
| Methyl amyl ketone | with HALS 1 | 0.7 | 0.8 | 1.0 |
| Tertraglyme | no HALS | 1.2 | 1.6 | 2.0 |
| Tertraglyme | with HALS 1 | 1.1 | 1.4 | 1.7 |
| Xylene | no HALS | 0.6 | 0.7 | 1.1 |
| Xylene | with HALS 1 | 0.8 | 0.8 | 0.9 |

Example 11

Solutions of 100 mM 2-[2-(2-methoxyethoxy)ethoxy] ethyl 3-(benzotriazol-2-yl)-5-tert-butyl-4-hydroxyhydrocinnamate, compound TP3 of U.S. Pat. No. 6,614,578, in propylene carbonate containing 3% by weight based on solvent are exposed alone or in the presence of 5 mM HALS 1 or HALS 6 in an Atlas 4,000 xenon weatherometer as described above. The UV absorbance of the benzotriazole is obtained before and after exposure. The loss of absorbance at the absorption maximum indicates degradation of the UVA as reported in the table below.

| | | Abs. @~342 nm | | Loss of |
|---|---|---|---|---|
| HALS | Conc. | 0 hr | 1210 hr | Abs. |
| No HALS | — | 1.62 | 0.82 | 0.80 |
| HALS 1 | 5 mM | 1.65 | 1.48 | 0.17 |
| HALS 6 | 5 mM | 2.00 | 1.75 | 0.25 |

HALS of the instant invention provide excellent protection against UVA degradation.

Example 12

The electrochromic dyes, 1,1'-dibenzyl-4,4'-bipyridinium dichloride (8.6 milligrams) and 5,10-dihydro-5,10-dimethylphenazine (4.6 milligrams) are added to 25 mL of a solution of 2-[2-(2-methoxyethoxy)ethoxy]ethyl 3-(benzotriazol-2-yl)-5-tert-butyl-4-hydroxyhydrocinnamate (100 mM) and HALS 1 (30 mM) in propylene carbonate containing 3% by weight based on solvent PMMA. Two pieces of indium tin oxide coated glass taken from a commercial electrochromic automotive mirror connected by copper wires to a direct current power supply are suspended in the solution. Voltage ranging from 0 to 1 volt is gradually and the rapid color change of the solution to a dark blue is noted. The voltage is then reduced and the color fades, the solution becoming clear and colorless at 0 volts.

HALS of the present invention do not interfere with the functioning of an electrochromic device.

What is claimed is:

1. A composition which is suitable as a medium in an electrochromic device, which composition comprises
    a) one or more solvents suitable as a medium in an electrochromic device selected from the group consisting of ketones, cyclic esters, cyclic carbonates and glycidyl ether carbonates, and one or more materials which are a functional element of an electrochromic device,
    b) an effective amount of one or more ultraviolet light absorbers selected from the group consisting of hydroxyphenylbenzotriazoles and tris-aryl-s-triazines, and
    c) an effective amount of one or more N—H or N-alkyl hindered amine light stabilizers of formula A'

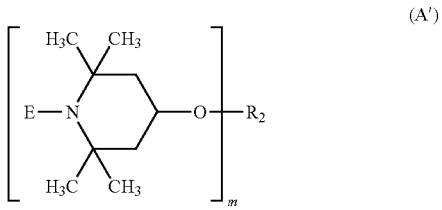

wherein
    E is hydrogen or $C_1$-$C_{18}$ alkyl,
    m is 1 to 4,
    when m is 1,
    $R_2$ is hydrogen, $C_1$-$C_{18}$alkyl or said alkyl optionally interrupted by one or more oxygen atoms, $C_2$-$C_{12}$ alkenyl, $C_7$-$C_{18}$aralkyl, glycidyl, a monovalent acyl radical of a $C_2$-$C_{18}$ aliphatic carboxylic acid, said aliphatic monovalent acyl radical of a $C_2$-$C_{18}$ aliphatic carboxylic acid substituted by one or more hydroxy, $C_1$-$C_8$ alkoxy, $C_2$-$C_8$ acyloxy, carbonyl, carboxy or $C_2$-$C_8$ alkoxy carbonyl, a monovalent acyl radical of a $C_5$-$C_{12}$ cycloaliphatic carboxylic acid or a monovalent acyl radical of a $C_7$-$C_{15}$ aromatic carboxylic acid, or
    when m is 2,
    $R_2$ is $C_1$-$C_{12}$alkylene, $C_4$-$C_{12}$alkenylene, xylylene, a divalent acyl radical of an aliphatic dicarboxylic acid having 2-18 C atoms, or a cycloaliphatic or aromatic dicarboxylic acid having 8-14 C atoms
    when m is 3,
    $R_2$ is a trivalent acyl radical of a $C_4$-$C_{12}$ aliphatic or $C_6$-$C_{12}$ cycloaliphatic tricarboxylic acid;
    when m is 4,
    $R_2$ is a tetravalent acyl radical of a $C_5$-$C_{12}$ saturated tetracarboxylic acid.

2. A composition according to claim 1 which comprises an electrolyte as one of the one or more functional elements of an electrochromic device.

3. A composition according to claim 1, wherein at least one of the one or more solvents is selected from the group consisting of ketones and cyclic carbonates.

4. A composition according to claim 1, wherein at least one of the one or more solvents is selected from the group consisting of acetone, methyl ethyl ketone, methyl amyl ketone, cyclopentanone, cyclohexanone, benzoyl acetone, 4-hydroxy-4-methyl-2-pentanone, acetophenone, beta-propiolactone, 2-acetylbutyrolactone, gamma-butyrolactone, gamma-valerolactone, 4-ethenyl-1,3-dioxalane-2-one, propylene carbonate, ethylene carbonate and 1,2-butylene carbonate.

5. A composition according to claim 1, wherein at least one of the one or more solvents is selected from the group consisting of acetone, methyl ethyl ketone, methyl amyl ketone, cyclopentanone, cyclohexanone, 4-ethenyl-1,3-dioxalane-2-one, propylene carbonate, ethylene carbonate and 1,2-butylene carbonate.

6. A composition according to claim 1, wherein at least one of the one or more solvents is selected from the group consisting of methyl amyl ketone and propylene carbonate.

7. A composition according to claim 1, wherein at least one of the one or more ultraviolet light absorbers is selected from the group consisting of 2-[2-hydroxy-5-($C_1$-$C_{12}$ alkyl or branched alkyl)phenyl]-2H-benzotriazole, 2-[2-hydroxy-3-($C_1$-$C_{12}$ alkyl or branched alkyl)-5-($C_1$-$C_{12}$ alkyl or branched alkyl)phenyl]-2H-benzotriazole, 2-[2-hydroxy-3,5-di($\alpha,\alpha$-dimethylbenzyl)phenyl]-2H-benzotriazole, 2-[2-hydroxy-3-($\alpha,\alpha$-dimethylbenzyl)-5-($C_1$-$C_{12}$alkyl or branched alkyl)]-2H-benzotriazole, $C_1$-$C_{18}$ alkyl or branched alkyl esters of 3-(benzotriazol-2-yl)-5-tert-butyl-4-hydroxyhydro -cinnamic acid, 2-methoxyethyl 3-(benzotriazol-2-yl)-5-tert-butyl-4-hydroxyhydrocinnamate, 2-(2-methoxyethoxy)ethyl 3-(benzotriazol-2-yl)-5-tert-butyl-4-hydroxyhydrocinnamate, 2-[2-(2-methoxyethoxy)ethoxy]ethyl 3-(benzotriazol-2-yl)-5-tert-butyl-4-hydroxyhydro -cinnamate, 2-{2-hydroxy-3-tert-butyl-5-[2-(omega-hydroxy -octa(ethyleneoxy)carbonyl)ethyl]phenyl}-2H-benzotriazofe, 5-chloro-2-[2-hydroxy-5-($C_1$-$C_{12}$ alkyl or branched alkyl)phenyl]-2H-benzotriazole, 5-chloro-2-[2-hydroxy-3-($C_1$-$C_{12}$ alkyl or branched alkyl)-5-($C_1$-$C_{12}$ alkyl or branched alkyl) -phenyl]-2H-benzotriazole, 5-chloro-2-[2-hydroxy-3,5-di($\alpha,\alpha$-dimethylbenzyl)phenyl]-2H-benzotriazole, 5-chloro-2-[2-hydroxy-3-($\alpha,\alpha$-dimethylbenzyl)-5-($C_1$-$C_{12}$ alkyl or branched alkyl)]-2H-benzo-triazole, $C_1$-$C_{18}$ alkyl or branched alkyl esters of 3-(5-chloro-benzotriazol-2-yl)-5-tert-butyl-4-hydroxy -hydrocinnamic acid, 2-methoxyethyl 3-(5-chloro-benzotriazol-2-yl)-5-tert-butyl-4-hydroxyhydrocinnamate, 2-(2-methoxyethoxy)ethyl 3-(5-chloro-benzotriazol-2-yl)-5-tert-butyl-4-hydroxyhydrocinnamate, 2-[2-(2-methoxyethoxy)ethoxy]ethyl 3-(5-chloro-benzotriazol-2-yl)-5-tert-butyl-4-hydroxyhydro -cinnamate, 5-chloro-2-{2-hydroxy-3-tert-butyl-5-[2-(omega-hydroxy-octa(ethyleneoxy)carbonyl)ethyl]-phenyl}-2H-benzotriazole, 5-trifluoro-2-[2-hydroxy-5-($C_1$-$C_{12}$ alkyl or branched alkyl)phenyl]-2H-benzotriazole, 5-trifluoro-2-[2-hydroxy-3-($C_1$-$C_{12}$ alkyl or branched alkyl)-5-($C_1$-$C_{12}$ alkyl or branched alkyl) -phenyl]-2H-benzotriazole, 5-trifluoro-2-[2-hydroxy-3,5-di($\alpha,\alpha$-dimethylbenzyl)phenyl]-2H -benzotriazole, 5-trifluoro-2-[2-hydroxy-3-($\alpha,\alpha$-dimethylbenzyl)-5-($C_1$-$C_{12}$ alkyl or branched alkyl)]-2H-benzo -triazole, $C_1$-$C_{18}$ alkyl or branched alkyl esters of 3-(5-trifluoro-benzotriazol-2-yl)-5-tert-butyl-4-hydroxy -hydrocinnamic acid, 2-methoxyethyl 3-(5-trifluoro-benzotriazol-2-yl)-5-tert-butyl-4-hydroxyhydrocinnamate, 2-(2-methoxyethoxy)ethyl 3-(5-trifluoro-benzotriazol-2-yl)-5-tert-butyl-4-hydroxyhydro -cinnamate, 2-[2-(2-methoxyethoxy)ethoxy]ethyl 3-(5-trifluoro-benzotriazol-2-yl)-5-tert-butyl-4-hydroxy -hydrocinnamate, 5-trifluoro-2-{2-hydroxy-3-tert-butyl-5-[2-(omega-hydroxy-octa(ethyleneoxy)carbonyl)ethyl]-phenyl}-2H-benzotriazole 2,4-bis(2,4-dimethylphenyl)-6-(2-hydroxy-4-($C_1$-$C_{12}$ alkyl or branched alkyl)oxyphenyl)-s -triazine, 2,4-diphenyl-6-(2-hydroxy-4-($C_1$-$C_{12}$ alkyl or branched alkyl)oxyphenyl)-s-triazine, 2,4-bis(2,4-dimethylphenyl)-6-[2-hydroxy-4-(3-do-/tridecyloxy-2-hydroxypropoxy)phenyl]-s-triazine, 2,4-bis(2,4-dimethylphenyl)-6-[2-hydroxy-4-(3-do-/tridecyloxy-2-hydroxypropoxy)-5-$\alpha$-cumyl -phenyl]-s-triazine, 2-[2-hydroxy-4-(1($C_1$-$C_{18}$ alkyl or branched alkyl)oxycarbonylethoxy)phenyl]-4,6-bis(4-phenylphenyl)-1,3,5-triazine, and the reaction product of 2,4,6-tris(2,4-dihydroxyphenyl)-s-triazine with octyl $\alpha$-haloacetate.

8. A composition according to claim 1, wherein at least one of the one or more ultraviolet light absorbers is selected from the group consisting of 2-(2-hydroxy-5-methylphenyl)-2H-benzotriazole, 2-(2-hydroxy-5-tert-octylphenyl-2H-benzotriazole, 2-(2-hydroxy-3,5-di-tert-amylphenyl)-2H-benzotriazole, 2-(2-hydroxy-3-sec-butyl-5-tert-butylphenyl)-2H-benzotriazole, 2-(2-hydroxy-3-dodecyl-5-methylphenyl)-2H-benzotriazole, 2-[2-hydroxy-3,5-di($\alpha,\alpha$-dimethylbenzyl)phenyl]-2H-benzotriazole, 2-[2-hydroxy-3-($\alpha,\alpha$-dimethylbenzyl)-5-tert-octylphenyl]-2H-benzotriazole, octyl 3-(benzotriazol-2-yl)-5-tert-butyl-4-hydroxyhydrocinnamate, butyl 3-(benzotriazol-2-yl)-5-tert-butyl-4-hydroxyhydrocinnamate, pentyl 3-(benzotrlazol-2-yl)-5-tert-butyl-4-hydroxyhydroclnnammte, 2-methoxysthyl 3-(benzotriazol2-yl)-5-tert-butyl-4-hydroxyhydrocinnamate, 2-(2-methoxyethoxy)ethyl 3-(benzotrlazol-2-yl)-5-tert-butyl-4-hydroxyhydrocinnamate, 2-[2-(2-methoxyethoxy)ethoxy]ethyl 3-(benzobmzol-2-yl)-5-tert-butyl-4-hydroxyhydro -cinnamate, 2-{2-hydroxyd-but[2-(omega-hydroxy-octa(ethyleneoxy)carbonyl)ethyl]phenyl}-2H -benzotriazole, 5-chloro-2-(2-hydroxy-3-tert-butyl-5-methylphenyl)-2H-benzotilazol, 5-chloro-2-(2-hydroxy-3,5-dI-tert-butylphenyo-2H-benzotllazole, octyl 3-(5-chlorobenzotzlazol-2-yl)-5-tert-butyt-4-hydroxyhydrocinnamate, octyl 3-(5-trifluoromethyt-benzotdazol-2-yl-5-tert-butyl-4-hydroxyhydrocinnamate, butyl 3-(5-trifluoromethyl-benzotdazol-2-yl)-5-tert-butyl-4-hydroxyhydrocinnamate, pentyl 3-(5-trlfluoromethyl-benzotdazol-2-yl)-5-tert-butyl-4-hydroxyhydrocinnamate, 5-triflouromethyl-2{2-hydroxy-3-tert-butyl-5[2-(omega-hydroxy-octa(ethyleneoxy)carbonyl) -ethyl]pheny}-2H-benzotrimzole, 2-(2-methoxyethoxy)ethyl 3-(5-trifluoromethylbenzotrizol-2-yl-5-tert-butyl-4-hydroxyhydro -cinnamate, 2-[2-(2-methoxyethoxy)ethoxy]ethyl3-(5-trifluoromethylbenzotriazol-2-yl)-5-tert-butyl-4-hydroxyhydrocinnamate, 2,4-bis(2,4-dimethylphenyl-6-(2-hydroxy-4-octyloxyphenyl)-s-triazine, 2,4-bis(2,4-dimethylphenyl)-6-[2-hydroxy-4-(3-do-/tridecyloxy-2-hydroxypropoxy)phenyl]-s -triazine, 2-[2-hydroxy-4-(1-octyoxycarbonylethoxy)phenyl]-4,6-bis(4-phenylphenyl)-1,3,5-tiiazlne and the reaction product of 2,4,6-tris(2,4-dihydroxyphenyl)-s-triazine with octyl α-haloacetate.

9. The composition according to claim 1, wherein at least one of the one or more N—H or N-alkyl hindered amine light stabilizers is selected from the group consisting of
4-hydroxy-2,2,8,6-tetramethylpiperidine,
4-hydroxy-1,2,2,6,6-pentamethylpiperidine,
1-allyl-4-hydroxy-2,2,6,6-tetramethylpiperidine,
1-benzyl-4-hydroxy-2,2,6,6-tetramethylpiperidine,
2,2,6,6-tetramethyl-4-piperidyl or 1,2,2,6,6-pentamethyl-4-piperidyl esters of C2-C24 carboxylic acids or said carboxylic acids substituted by one or more hydroxy, C1-C8alkoxy, C2-C8acyloxy, carbonyl, carboxy or C2-C8 alkoxy carbonyl;
2,2,6,6-tetramethyl-4-piperidyl or 1,2,2,6,6-pentamethyl-4-piperidyl bis esters of C2-C10 di-carboxylic acids.

10. A composition according to claim 1 where at least one of the one or more the N—H or N-alkyl hindered amine light stabilizer selected from the group consisting of
4-hydroxy-2,2,6,6-tetramethylpiperidine,
4-hydroxy-1 2,2,6,6-pentamethylpiperidine,
bis(2,2,6,6-tetramethylpiperidin-4-yl) sebacate,
bis(1,2,2,6,6-pentamethylpiperidin-4-yl) sebacate,
bis(2,2,6,6-tetramethylpiperidin-4-yl) succinate,
bis(1,2,2,6,6-pentamethylpiperidin-4-yl) succinate and
4-stearyloxy-2,2,6,6-tetramethylpiperidine.

11. The composition according to claim 1, wherein at least one of the one or more N—H or N-alkyl hindered amine light stabilizers is a N-methyl HALS.

12. A composition according to claim 1 where ultraviolet light absorbers and hindered amine stabilizers, in total, are present from about 0.05% to about 30% by weight, based on the weight of the solvent.

13. A composition according to claim 1 where ultraviolet light absorbers and hindered amine stabilizers, in total, are present from about 0.1% to about 15% by weight, based on the weight of the solvent.

14. The composition according to claim 1 wherein m is 1 or m is 2, E is hydrogen or $C_1$-$C_{18}$ alkyl, when m is 1, $R_2$ is hydrogen, $C_1$-$C_{18}$alkyl or said alkyl optionally interrupted by one or more oxygen atoms, $C_7$-$C_{18}$aralkyl, glycidyl, a monovalent acyl radical of a $C_2$-$C_{18}$ aliphatic carboxylic acid, said aliphatic monovalent acyl radical of a $C_2$-$C_{18}$ aliphatic carboxylic acid substituted by one or more hydroxy, $C_1$-$C_8$ alkoxy, $C_2$-$C_8$ acyloxy, $C_2$-$C_8$ alkoxy carbonyl and when m is 2, $R_2$ is $C_1$-$C_{12}$alkylene or a divalent acyl radical of an aliphatic dicarboxylic acid having 2-18 C atoms.

15. A method of preparing a stablized medium useful in electrochromic devices, which method comprises adding to a composition comprising:

i) one or more solvents suitable as a medium in an electroactive device selected from the group consisting of ketones cyclic esters, cyclic carbonates and glycidyl ether carbonates and one or more more materials which are a functional element of an electrochromic device, and ii) an effective amount of one or ultraviolet light absorbers selected from the group consisting of hydroxyphenyl-benzotriazoles, and tris-aryl-s-triazines an effective amount of one or more N—H and N-alkyl hindered amine light stabilizers of formula A'

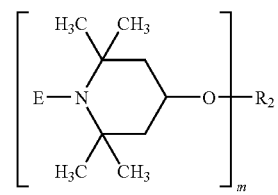

(A')

wherein
E is hydrogen or $C_1$-$C_{18}$ alkyl,
m is 1 to 4,
when m is 1,
$R_2$ is hydrogen, $C_1$-$C_{18}$alkyl or said alkyl optionally interrupted by one or more oxygen atoms, $C_2$-$C_{12}$alkenyl, $C_7$-$C_{18}$aralkyl, glycidyl, a monovalent acyl radical of a $C_2$-$C_{15}$ aliphatic carboxylic acid, said aliphatic monovalent acyl radical of a $C_2$-$C_{18}$ aliphatic carboxylic acid substituted by one or more hydroxy, $C_1$-$C_8$ alkoxy, $C_2$-$C_8$ acyloxy, carbonyl, carboxy or $C_2$-$C_8$ alkoxy carbonyl, a monovalent acyl radical of a $C_5$-$C_{12}$ cycloaliphatic carboxylic acid or a monovalent acyl radical of a $C_7$-$C_{15}$ aromatic carboxylic acid, or
when m is 2,
$R_2$ is $C_1$-$C_{12}$alkylene, $C_4$-$C_{12}$alkenylene, xylylene, a divalent acyl radical of an aliphatic dicarboxylic acid having 2-18 C atoms, or a cycloaliphatic or aromatic dicarboxylic acid having 8-14 C atoms
when m is 3,
$R_2$ is a trivalent acyl radical of a $C_4$-$C_{12}$ aliphatic or $C_6$-$C_{12}$ cycloaliphatic tricarboxylic acid;
when m is 4,
$R_2$ is a tetravalent acyl radical of a $C_5$-$C_{12}$ saturated tetracarboxylic acid.

* * * * *

UNITED STATES PATENT AND TRADEMARK OFFICE
CERTIFICATE OF CORRECTION

PATENT NO. : 7,595,011 B2 Page 1 of 1
APPLICATION NO. : 11/171176
DATED : September 29, 2009
INVENTOR(S) : Kanouni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Twenty-eighth Day of September, 2010

David J. Kappos
*Director of the United States Patent and Trademark Office*